United States Patent [19]

Kakihara et al.

[11] Patent Number: 5,109,344
[45] Date of Patent: Apr. 28, 1992

[54] VEHICLE NAVIGATION APPARATUS EMPLOYING NODE SELECTION, COMPARISON AND ELIMINATION TECHNIQUES

[75] Inventors: Masaki Kakihara, Hiroshima; Masao Sasaki, Higashihiroshima, both of Japan

[73] Assignee: Mazda Motor Corporation, Hiroshima, Japan

[21] Appl. No.: 342,951

[22] Filed: Apr. 25, 1989

[30] Foreign Application Priority Data

Apr. 28, 1988 [JP] Japan .................................. 63-106556
Apr. 30, 1988 [JP] Japan .................................. 63-108175
Apr. 30, 1988 [JP] Japan .................................. 63-108176

[51] Int. Cl.⁵ .......................................... G06F 15/50
[52] U.S. Cl. ...................... 364/449; 364/450; 364/444; 340/990
[58] Field of Search ............... 364/443, 444, 449, 450; 340/988, 990, 995, 992; 342/451; 73/178 R

[56] References Cited

U.S. PATENT DOCUMENTS

| | | | |
|---|---|---|---|
| 4,734,863 | 3/1988 | Honey et al. ........................ | 364/449 |
| 4,774,672 | 9/1988 | Tsunoda et al. .................... | 364/449 |
| 4,792,907 | 12/1988 | Ikeda et al. ........................ | 364/449 |
| 4,796,191 | 1/1989 | Honey et al. .................... | 364/449 X |
| 4,852,012 | 7/1989 | Suyama ............................ | 364/449 |
| 4,862,398 | 8/1989 | Shimuzu et al. ................ | 364/571.05 |
| 4,866,627 | 9/1989 | Suyama ............................ | 364/457 |
| 4,964,052 | 10/1990 | Ohe ................................ | 364/449 |
| 5,003,306 | 3/1991 | Takahashi et al. ............. | 364/449 X |
| 5,046,911 | 9/1991 | Kakihara et al. ................ | 364/449 |

FOREIGN PATENT DOCUMENTS 61-209316 9/1986 Japan .

*Primary Examiner*—Thomas G. Black
*Assistant Examiner*—Thomas S. Auchterlonie
*Attorney, Agent, or Firm*—Price, Heneveld, Cooper, DeWitt & Litton

[57] ABSTRACT

A vehicle navigation apparatus which selects possible target nodes stored in memory based on the present position of the vehicle and then eliminates those nodes not possible to reach after comparing the bearing from the present position of the vehicle to each selected node with the present bearing of the vehicle. The navigation apparatus determines that the vehicle is traveling on a road-not-in-memory when the number of possible nodes is reduced to zero. The navigation apparatus repeatedly searches, after each predetermined travel distance, for possible nodes within a progressively widening search circle, the radius of which is related to the distance traveled. When a target is found which is stored in memory the apparatus determines that the vehicle has returned to travel on a road stored in memory.

11 Claims, 16 Drawing Sheets

ROAD-NOT-IN-MEMORY TRAVEL MODE

CONNECTIONS BETWEEN NODES IN MEMORY

ROAD-IN-MEMORY TRAVEL MODE

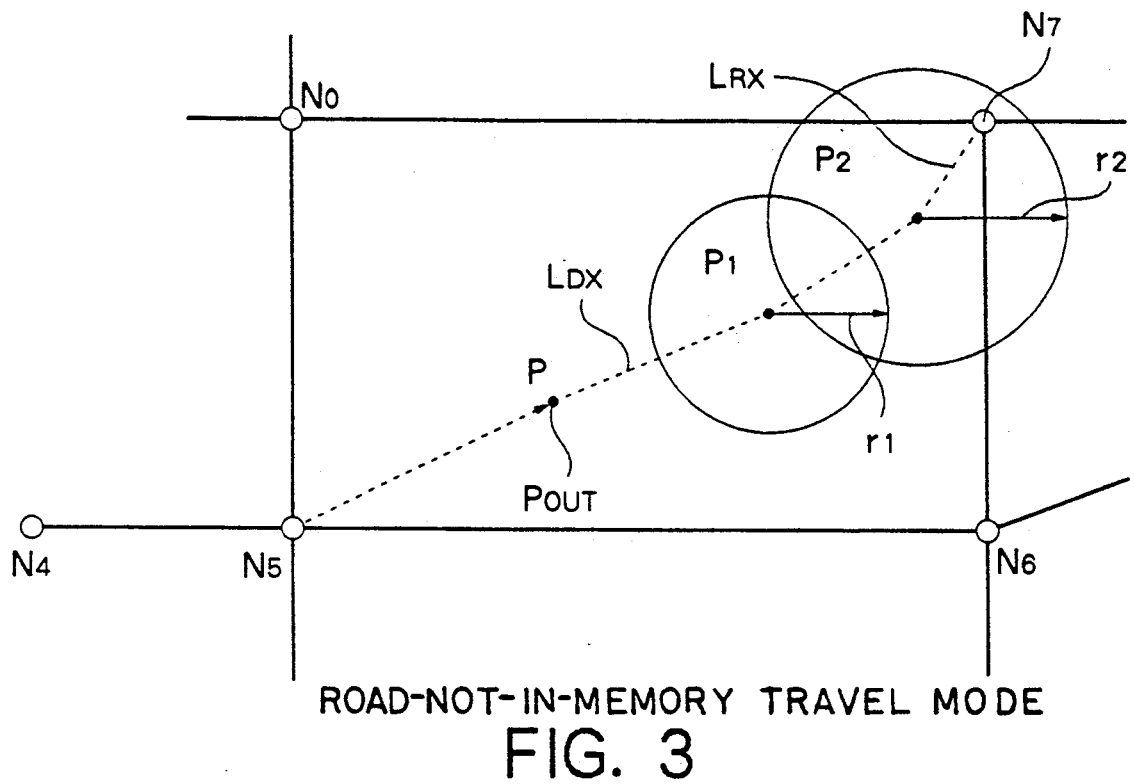
ROAD-NOT-IN-MEMORY TRAVEL MODE
FIG. 3
FIG. 5
CORNER DETECTION
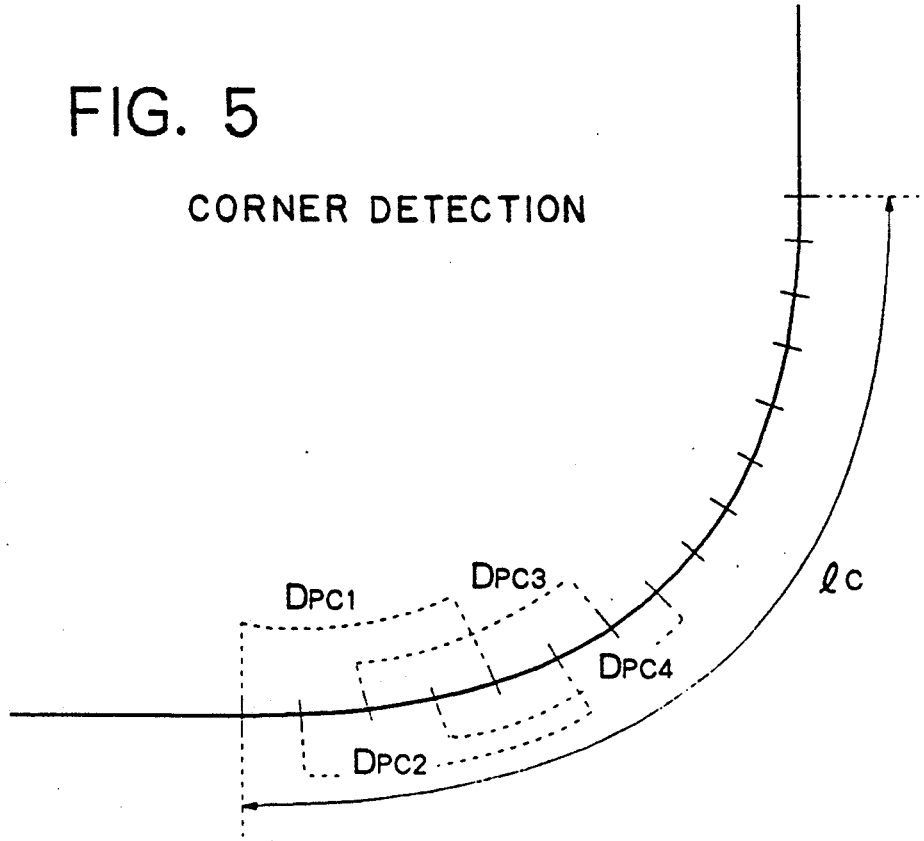

CORNER DETECTION (LARGE CURVATURE) CURVE DETECTION

| $D_{M1}$ | $D_{M2}$ | $D_{M3}$ | ............................................. | $D_{Mn}$ |
|---|---|---|---|---|

| d (TRAVEL DISTANCE) | DM (MAGNETIC DECLINATION) | DP (AVERAGE) |
|---|---|---|

| $D_{P0}$ | $D_{P1}$ | ............................................. | $D_{Pn}$ |
|---|---|---|---|

| Px (PRESENT DEAD RECKONING POSITION) | PD (DISPLAYED POSITION) |
|---|---|
| Pc (CORNER RECOGNITION POSITION) | Pout (POSITION OUT OF ROAD IN MEMORY) |
| NA | NB |
| NL (LATEST ARRIVAL NODE) | Fon (ROAD IN MEMORY TRAVELING FLAG) |
| FD (CORNER ENTERING FLAG) | Fc (CORNER DETECTION FLAG) |

| FA (STORED NODE ARRIVAL FLAG) | LD | LDX |
|---|---|---|

| Ni (ASSIGNABLE NODES) | θi (DIRECTION OF NODE CONNECTION) | LRi (REMAINING DISTANCE) |
|---|---|---|
| ⋮ | ⋮ | ⋮ |
| NM | | |

} ASSIGNABLE NODE LIST (ROADS IN MEMORY)

| NODE INFORMATION |
|---|

| ARRIVAL NODE LIST |
|---|

FIG. 8

DETERMINING TRAVEL UPON A
ROAD-NOT-IN-MEMORY VIA
ADAPTIVE THRESHOLD K

ADAPTIVE THRESHOLD K AS A
FUNCTION OF DISTANCE TRAVELLED

VEHICLE NAVIGATION APPARATUS EMPLOYING NODE SELECTION, COMPARISON AND ELIMINATION TECHNIQUES

BACKGROUND OF THE INVENTION

This invention relates to an apparatus for navigating a vehicle and, more particularly, to a vehicle navigation system for guiding a traveling vehicle based on assuming the present position of the vehicle from the direction in which the vehicle is traveling and from the distance traveled from a reference point, and effecting matching between the assumed present position and previously stored road data relative to a map.

Development of a type of vehicle navigation system based on dead reckoning has been progressing. In this type of vehicle navigation system, the present position of a vehicle is assumed from the compass direction in which the vehicle is traveling obtained by an azimuth sensor utilizing earth magnetism and from the distance traveled from a reference point obtained by a distance sensor, and the assumed present position and map data on the vicinity are displayed on a screen of a display device, thereby enabling guidance for the vehicle. Since this dead reckoning navigation system is designed to assume the present position of the vehicle relative to the reference point on the basis of the direction obtained by the azimuth sensor and the distance traveled obtained by the distance sensor, errors in measurement of the distance traveled and the direction are accumulated as the vehicle moves away from the reference point, resulting in a reduction in the accuracy with which the present position can be determined.

To eliminate the defects of this dead reckoning navigation system, a technique called "map matching navigation" has been developed. An example of map matching navigation is disclosed in Japanese Patent Laid-Open No.61-209316 in which the arrangement is such that when the vehicle passes over a point where the road has a specific feature such as an intersection, the present position of the vehicle assumed previously by dead reckoning is corrected to the position of that distinctive point. If the number of distinctive points where map matching is to be performed when the vehicle passes is large enough to ensure that each distinctive point is reached before the accumulated error due to dead reckoning becomes excessive, map matching can be performed correctly at the destined distinctive points. It is therefore possible to say that map matching navigation is free from the drawbacks of the conventional dead reckoning navigation.

In this known map matching navigation, a judgment is made to determine which one of a plurality of distinctive points is being passed by the vehicle in such a manner that the distinctive point which is closest to the present position obtained by dead reckoning is simply regarded as the place which the vehicle is currently passing.

However, in the case of matching a road on the map with the present position of the vehicle, as assumed with a certain measurement error, there is a possibility of failure to properly match the vehicle position with the road on which the vehicle is actually traveling. To understand this possibility, the following case may be assumed. If there are a plurality of roads extending relatively close to each other, and if the vehicle travels along one of these roads, it is possible that two or more intersections simultaneously appear to be close to the vehicle. In such a case, it is difficult to effect correct matching, and the present position of the vehicle may be matched with a road that is not actually that along which the vehicle is traveling. Once the present position of the vehicle has been matched with a wrong road, it is impossible to correctly perform subsequent matching operations.

In particular, in urban regions, many roads intersect each other at closely spaced locations. If map matching navigation is conducted in such a region, the possibility of failure to effect correct matching is high. Conventionally, no means for detecting passing and traveling along a corner has been used, and the accuracy in map matching navigation for traveling in urban regions has therefore been inadequate.

A method for map matching in which all roads are previously memorized and the vehicle position obtained by dead reckoning is constantly matched with corresponding points on the memorized roads is also known. However, there are roads which are not represented by any map information for various reasons. For example, in the case of a newly constructed road or in the case of a narrow road with little traffic, the possibility of information on the road being omitted is high. Map matching for traveling on a road which is not represented on the map necessarily results in failure to match the present position with the actual road.

An azimuth sensor for detecting the direction in which the vehicle travels is indispensable for dead reckoning, and the operation of the azimuth sensor entails a degree of error. For example, if the azimuth sensor is an earth magnetism sensor, measurement data output from the sensor contains an error due to magnetization. If such an error is ignored, the amount of accumulated error becomes large, resulting in a reduction in the map matching accuracy.

SUMMARY OF THE INVENTION

It is therefore an object of the present invention to provide a vehicle navigation system for guiding a traveling vehicle by matching the present position of the vehicle obtained by dead reckoning with a corresponding point on a road appearing on a map previously stored, the system being capable of performing matching with improved reliability and without any possibility of failure to match the present position with the corresponding road on the map.

It is another object of the present invention to provide a navigation system in which a target node is selected from a plurality of assignable nodes in consideration of the direction in which the vehicle is traveling and the direction from the vehicle position to each assignable node, thereby improving the accuracy with which the target node is selected.

It is still another object of the present invention to provide a navigation system in which, in the process of selecting a target node from a plurality of assignable nodes in consideration of the direction in which the vehicle is traveling and the direction from the vehicle position to each assignable node, the assignable nodes are restricted to nodes connected to the node located at the starting point, thereby improving the efficiency of selection of the target node.

It is a further object of the present invention to provide a navigation system in which a target node is selected from a plurality of assignable nodes in consideration of the direction in which the vehicle is traveling and the direction from the vehicle position to each assignable node, and in which it is possible to confirm that the node selected as the target node is actually the target node.

It is a still further object of the present invention to provide a navigation system in which a target node is selected from a plurality of assignable nodes in consideration of the direction in which the vehicle travels and the direction from the vehicle position to each assignable node, and in which the target node is selected by reducing the plurality of assignable nodes by an elimination method, thereby improving the efficiency of selection of the target node.

It is a still further object of the present invention to provide a navigation system capable of recognizing, on the basis of stored data on the positions of nodes previously set on roads and on connections between the nodes, that the vehicle is traveling on a road which is not memorized.

It is a still further object of the present invention to provide a navigation system capable of recognizing, on the basis of the distance between the vehicle position and a memorized road, that the vehicle is traveling on a road which is not memorized.

It is a still further object of the present invention to provide a navigation system which prevents failure to recognize traveling along a road-in-memory owning to errors inevitable in dead reckoning. In the system, a threshold value is determined and the distance between the vehicle position and a road-in-memory is compared in order to recognize traveling along a road-not-in-memory. The threshold value generally increases generally in proportion to the traveled distance.

It is a still further object of the present invention to provide a navigation system capable of recognizing traveling along a non-memorized road by detecting the time when the number of assignable nodes becomes naught during reduction of assignable nodes on the basis of the elimination method.

It is a still further object of the present invention to provide a navigation system capable of recognizing when the vehicle starts traveling along a memorized road after traveling along a non-memorized road.

It is a still further object of the present invention to provide a navigation system in which the efficiency with which a node on a memorized road is selected during a process of recognizing that the vehicle has started traveling along a memorized road after traveling along a non-memorized road.

It is a still further object of the present invention to provide a navigation system capable of inhibiting map matching during traveling along a non-memorized road.

It is a still further object of the present invention to provide a navigation system capable of detecting passage around a corner.

It is a still further object of the present invention to provide a navigation system capable discriminating between passage around a corner and traveling along a curve.

It is a still further object of the present invention to provide a navigation system in which the accuracy with which map matching is effected is improved by calibration with respect to a deviation of an azimuth sensor.

BRIEF DESCRIPTION OF THE DRAWINGS

FIG. 3 is a schematic diagram of node restriction control operation during traveling on a road which is not memorized FIGS. 4A and 5 are diagrams of a principle of detection of a corner;

FIG. 8 is a diagram of a state of storage of flags and so forth in a RAM used for navigation control in accordance with the embodiment;

DESCRIPTION OF THE PREFERRED EMBODIMENT

A navigation system which represents an embodiment of the present invention will be described below in detail with reference to the accompanying drawings. The navigation system is provided with a CRT (cathode ray tube) apparatus for displaying, along with the vehicle position, map information stored in a CD-ROM (compact disk read only memory).

Nodes

In this embodiment, a point on a map with which the position assumed by dead reckoning is matched (identified), i.e., point with which the assured position is matched is represented as a node. A multiplicity of nodes set on roads represented on a map are stored as map information together with data on connections between the nodes in a map information storage device (13 in FIG. 7) described later. These nodes include nodes disposed at predetermined intervals on a straight road as well as those disposed at intersections and corners. This interval is such that even if a distance sensor and an azimuth sensor (described later) having ordinary accuracy are used to perform map matching based on dead reckoning, the accumulation of errors is limited to an extent small enough to ensure that an assumed position is identified as the corresponding matching point on the map. In Japanese Patent Laid Open No.61-209316, no notion of nodes is disclosed. In the method disclosed therein, only distinctive points such as intersections and the like are used as objects of matching, and, in a case where the distance between the distinctive points is great, there is a possibility of a disabled state of map matching navigation occurring owing to the accumulation of errors due to the adoption of a dead reckoning method, as described above.

Figure 1A:
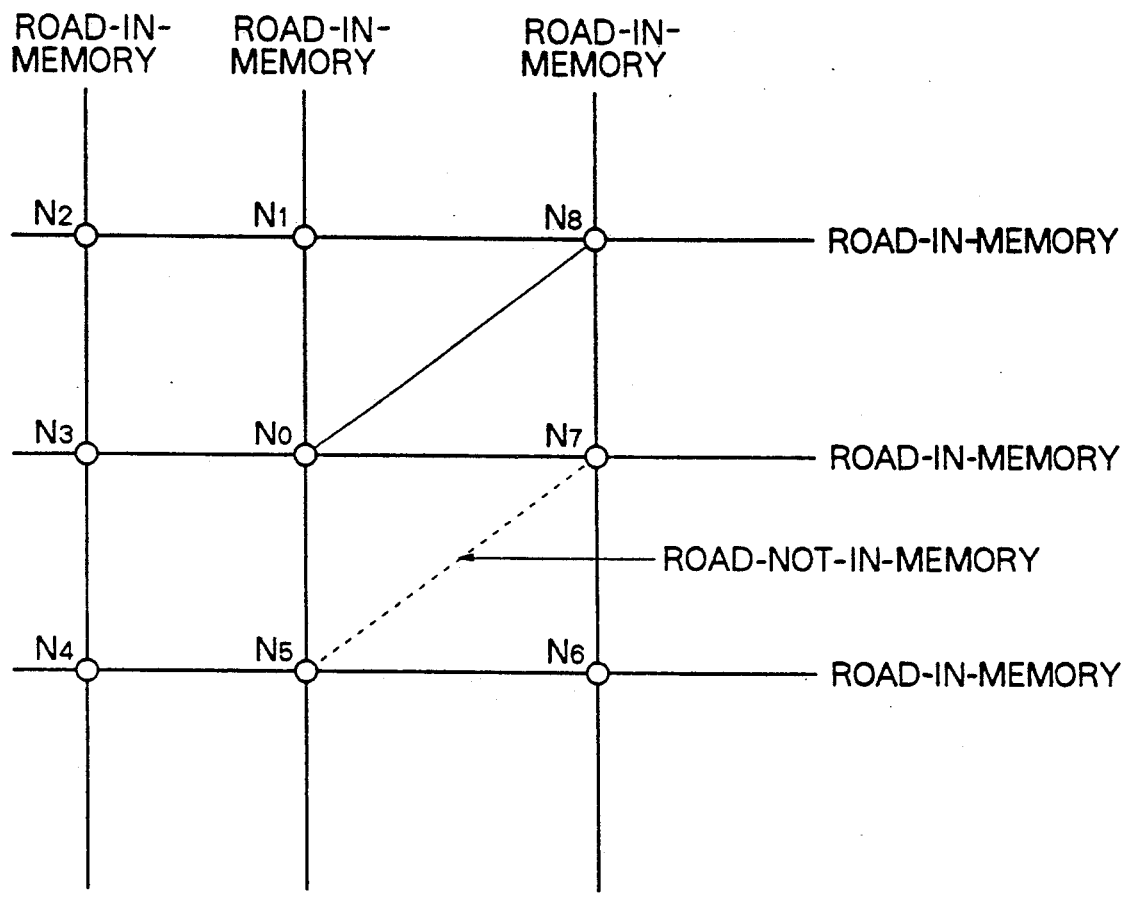
FIGS. 1A and 1B are diagrams of the relationship between nodes and roads and connections between the nodes.
Figure 1B:
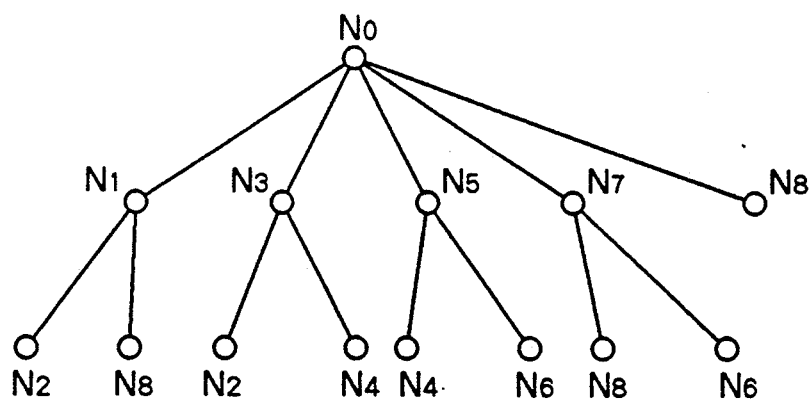

FIGS. 1A and 1B show the relationship between roads and nodes set on the roads. Solid lines which connect the nodes represent the roads memorized by the storage device as node position information together with information on connections between the nodes. These roads will be hereinafter referred to as "roads in memory". A broken line in FIG. 1A represents a road which is not memorized and which will be hereinafter referred to as "a road not in memory". The example of a road network shown in FIG. 1A has a grid pattern, and nodes $N_0$ to $N_8$ are set at intersections in this road network.

Data on connections between these nodes are stored in the map information storage device together with coordinates of the positions of these nodes. With respect to node $N_0$ in FIG. 1A, the connections between the nodes are expressed as links which connect node $N_0$ to adjacent nodes directly (i.e., by one step). In FIG. 1B, the connections between the nodes are expressed in another way with respect to the node $N_0$ to facilitate explanation.

As will be explained later, two operational modes: a mode of traveling along a road in memory"(hereinafter referred to as "road in-memory travel mode" and a mode of traveling along a road not in memory (hereinafter referred to as "road-not in memory travel mode" are set in the embodiment navigation system. During traveling along a road, e.g., the road between nodes $N_0$ and $N_7$ memorized in the storage device as map information, the operation is in the road-in-memory travel mode. The road-not-in memory travel mode is selected when the vehicle travels along a road which is not memorized in the storage device. In the road system shown in FIG. 1A, it is assumed that a road is constructed so as to directly connect nodes $N_0$ and $N_8$ after map information has been stored in the storage device, and that no information on that road is stored in the storage device. (As described later, a read-only type of memory is used as the storage device, and it is, in fact, impossible for the driver to write information on such a road.) Instead, the road connecting nodes $N_0$ and $N_8$ may be assumed to be a narrow road on which traffic is light and which is not memorized as road information in order to reduce the total amount of memory. It is possible that the vehicle will enter such a road.

Functions of Navigation System

The function of the embodiment of the navigation system shown in FIG. 7 will be briefly described below.

(a) Node search function

This search function is used to determine a target node by searching a node tree, such as that described above in conjunction with FIG. 1B, for nodes (assignable nodes) which are considered to be logically possible to reach by the vehicle, and eliminating some of the assignable nodes which are regarded as incorrect to select as the target node on the basis of the traveling direction and the traveled distance.

(b) Road-not-in-memory travel recognition function

This function is used to recognize that the vehicle is proceeding from a road in memory to a road not in memory.

(c) Corner travel detection function

This function is used to recognize detection of a corner passed by the vehicle while preventing misidentification of a curve as a corner.

(d) Earth magnetism error calibration function

This function is used to correct error due to magnetization of the earth magnetism sensor.

(e) Function of inhibiting map matching during traveling along road not in memory A conventional map matching method in which the present position obtained by dead reckoning is matched with a memorized road each time the vehicle travels through a certain distance and which was established without any match of nodes has been adopted for map matching navigation. In this method, the present position is always matched with wrong roads as long as the vehicle travels along roads not in memory. To cope with this problem, map matching is inhibited on the basis of recognition of traveling along a road not in memory until the vehicle enters a road in memory.

(f) Function of recognizing return from road not in memory to road in memory

This function is reverse to the function (b). Proceeding from a road not in memory to a road in memory is recognized when a node is reached. To positively identify the reached node, assignable nodes are selected under certain conditions (described later) with respect to node searching during traveling along a road not in memory, as explained later.

Outline of Node Searching during Traveling on Road in Memory

The above-described two modes: "road-in-memory travel mode" and "road-not-in-memory travel mode" are indicated by flag $F_{ON}$. When $F_{ON}=1$, the road-in-memory travel mode is selected. When $F_{ON}=0$, the road-not-in-memory travel node is selected.

Figure 2A:
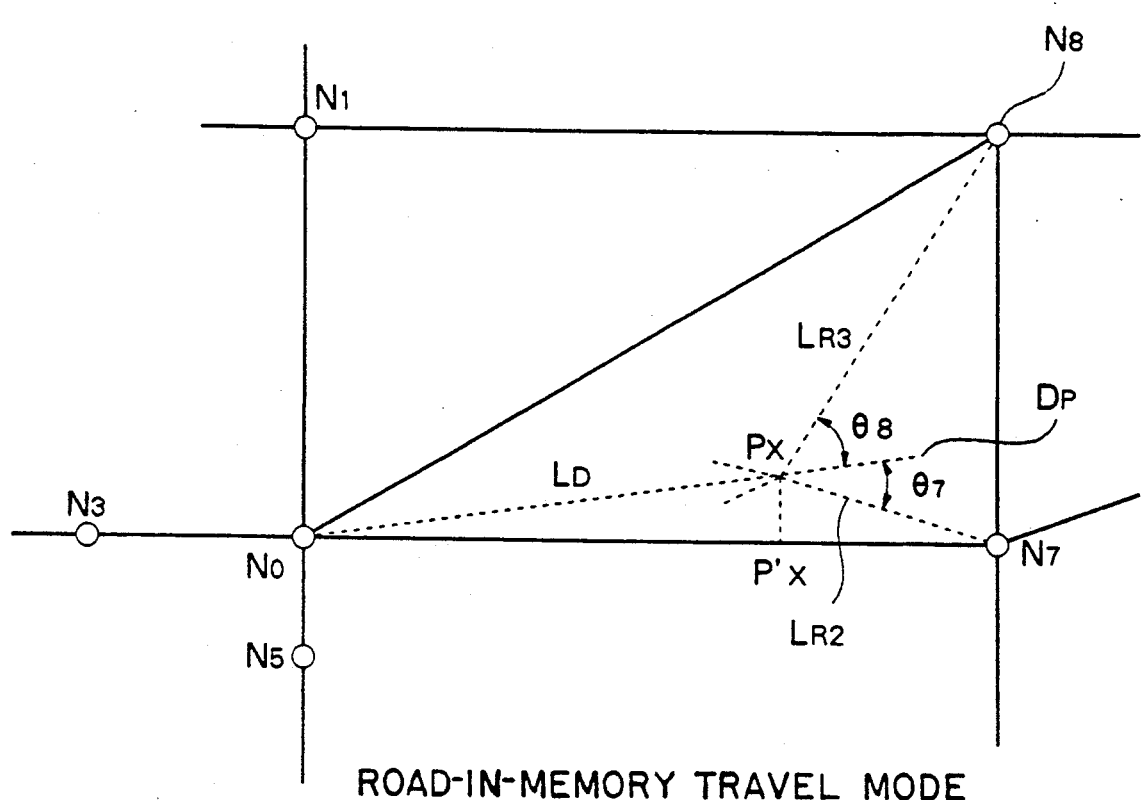
FIG. 2A is a schematic diagram of a node search control during traveling on a memorized road.

FIG. 2A is a diagram of operation of the embodiment navigation system in the road-in-memory travel mode ($F_{ON}=1$). In FIG. 2A, a case of traveling from node $N_0$ to $N_7$ is illustrated.

Figure 2B:
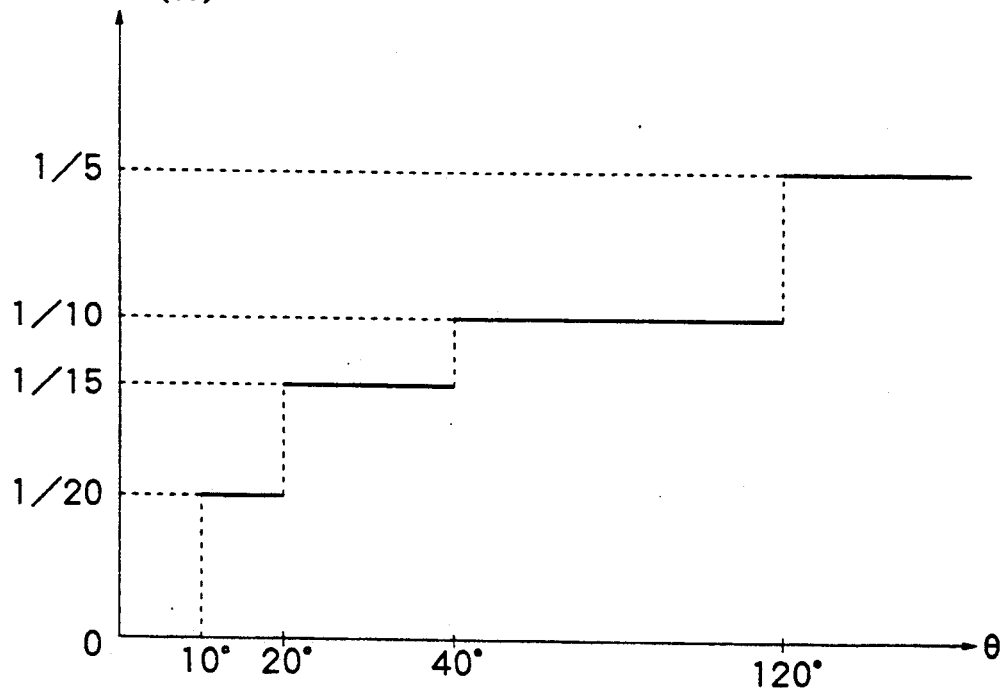
FIG. 2B is a diagram of a characteristic of a weighting function W used for node searching during traveling on a memorized road.

Five roads $N_0$–$N_3$, $N_0$–$N_1$, $N_0$–$N_8$, $N_0$–$N_7$, and $N_0$–$N_5$ extend from node $N_0$. Node searching is conducted to find, on the basis of data Px (x, y) on the present position and data Dp on the traveling direction obtained by dead reckoning, a node to which the vehicle is actually traveling, i.e., a target node among nodes which are considered to be logically possible to reach (hereinafter referred to as "assignable nodes"), In this case, node $N_7$ is found among Nodes $N_3$, $N_1$, $N_8$, $N_7$, and $N_5$. For node searching, the possibility that each node may be the target node is calculated on the basis of a predetermined evaluation formula, and assignable nodes which, as a result of calculation, do not satisfy certain conditions are eliminated from the group of nodes assigned to the next operation. A function $\theta_{Ni}$ for evaluating assignable nodes Ni is expressed as follows:

$$\theta_{Ni} = \frac{W \times \theta_i}{L_D} \quad (1)$$

where W represents a weight function, e.g., a function of $\theta i$, such as that shown in FIG. 2B; $\theta i$ represents the bearing from the present position to the assignable node; and $L_D$ represents the distance traveled from the node recognized by the preceding operation to the present position.

This node searching will be explained below with reference to FIG. 2A in which only nodes $N_8$ and $N_7$ are shown as assignable nodes to simplify explanation. The bearings to the assignable nodes $N_8$ and $N_7$ are first calculated. The weight W is determined on the basis of the characteristic shown in FIG. 2B from the bearing calculated with respect to each node, and the distance $L_D$ from the starting node $N_0$ to the present position Px (x, y) is calculated. Thereafter, the evaluation functions $\theta_{N7}$ and $\theta_{N8}$ are calculated. Since the present position Px (x, y) obtained by dead reckoning must be located on or close to the road between nodes $N_0$ and $N_7$, the bearing from the present position to the target node can be regarded as small. This is because the vehicle is traveling along the actual road to the target node and because $\theta i$ obtained by calculation is therefore necessarily small. The value of the evaluation function $\theta_{Ni}$ becomes larger if $\theta_i$ increases, because, as is apparent from the characteristic of W shown in FIG. 2B, W in the numerator of this function becomes larger if the bearing increases. One of the assignable nodes having a large value of the evaluation function $\theta_{Ni}$ is eliminated from the group of assignable nodes. In the example shown in FIG. 2A, node $N_8$ is eliminated.

This operation of node searching is repeated each time the vehicle travels through a certain distance, thereby successively eliminating assignable nodes each of which is not the target node. In the example shown in FIG. 2B, node $N_7$ is necessarily left alone as one assignable node when the vehicle actually reaches the target node $N_7$. At this time, the present position Px (s, y) obtained by dead reckoning can be regarded as very close to the coordinate position of node $N_7$. At this point, map matching is performed. That is, the present position is identified as (set to) the coordinate position of node $N_7$.

This is an outline of node searching in the road-in-memory travel mode and is the content of the above-mentioned function (a).

Traveling along Road not-in Memory

FIG. 3 is a diagram of an outline of node searching in the road-not-in-memory travel mode. FIG. 3 shows a case of traveling in which the vehicle travels from node $N_5$ to node $N_7$ on the node map shown in FIG. 1A along a road not in memory (indicated by the broken line), i.e., a road which is not memorized in the storage device though existing between nodes $N_5$ and $N_7$.

If the node searching process described above in conjunction with FIG. 2A is applied to the example shown in FIG. 3, nodes $N_4$, $N_0$, and $N_6$ are found from the storage device as assignable nodes which can be reached after starting from node $N_5$, but node $N_8$ is not included in the group of assignable nodes. Nodes $N_4$, $N_0$, and $N_6$ are then eliminated by the above-described node searching process in which assignable nodes each having a large valve of the evaluation function 1 are eliminated from the group of assignable nodes. The number of assignable nodes then becomes naught. In this embodiment, when the number of assignable nodes becomes naught, the operation of the system is recognized to be changed over from the road-in-memory travel mode to the road-not-in-memory travel mode. In this embodiment, node searching described above in conjunction with FIG. 2A is not continued after the system has been changed over to the road-not-in-memory travel mode. Instead, the present position obtained by dead reckoning is shown to the driver through the CRT device. At this time, the position of the vehicle may be displayed on the screen of the CRT device as a locus extending out of the roads on the map.

Since any road not in memory is connected to some road in memory, a traveling vehicle can approach a road in memory. The distance between the position based on dead reckoning and the approached node can be regarded close to zero though depending upon the accuracy of the dead reckoning. The position of the vehicle is identified as a position corresponding to the coordinate position of this node. In the example illustrated in FIG. 3, map matching is performed when the node $N_7$ is reached.

In FIG. 3, a process of traveling along the road not in memory from node $N_5$ to node $N_7$ via points P, $P_1$, and $P_2$ identified by dead reckoning is also shown. It is assumed here that traveling of the vehicle along the road not in memory is first recognized when the vehicle reaches the point P. Circles $r_1$ and $r_2$ shown in FIG. 3 define the ranges of node searching. While the above-described node searching during traveling along a road in memory is primarily intended to improve the accuracy with which the target node to be reached is determined, node searching during traveling along a road not in memory is intended to improve the efficiency with which the node to which the vehicle is approaching is determined from a number of nodes. This is because, during traveling along a road not in memory, it is not possible for the navigation system to assume which node will be reached. Logically, all the nodes stored in the storage device can be reached. If proceeding from a road not in memory to a road in memory is determined on the basis of arrival at a node on the road in memory, it is necessary to always calculate the distances between the vehicle position and all of the nodes. To determine that a node is reached, it is necessary to know that the distance between this node and the vehicle position becomes close to zero. To do so requires much time for calculation, and real-time processing for navigation is sacrificed. To avoid this problem, a search range such as that represented by each circle in FIG. 3 is set, and the distance is calculated with respect to only nodes within such a range. In the example shown in FIG. 3, there is no node within a domain defined by the search range when the point $P_1$ is reached (within the circle having a radius $r_1$), and no distance calculation is performed with respect to this point. Only node $N_7$ is located with a domain defined by the search range when the point $P_2$ is reached (within the circle having a radius $r_2$). At this time, the distance between the point $P_2$ and node $N_7$ alone is calculated. Thus, assignable nodes are eliminated to increase the navigation calculation speed.

In this embodiment, the range of node searching during traveling along a road not in memory is defined by a circle centered at the present point Px (x, y) and having a radius r which is determined by an equation:

$$r = L_{DX} \times \beta \quad (2)$$

where $L_{DX}$ represents the distance traveled from a point at which the deviation from the road in memory is recognized (point P in the example shown in FIG. 3), and $\beta$ is a constant (e.g., 0.2). In accordance with the equation 2, the search range is extended as the travel distance $L_{DX}$ increases.

In accordance with the method illustrated in FIG. 3, the factor $L_{DX}$ that determines the search range is measured from the point at which the deviation from the road in memory is recognized. However, it may be replaced with the distance from the node that has passed last (i.e., node $N_5$ in the example shown in FIG. 3).

Outline of Corner Detection

Figure 4A:
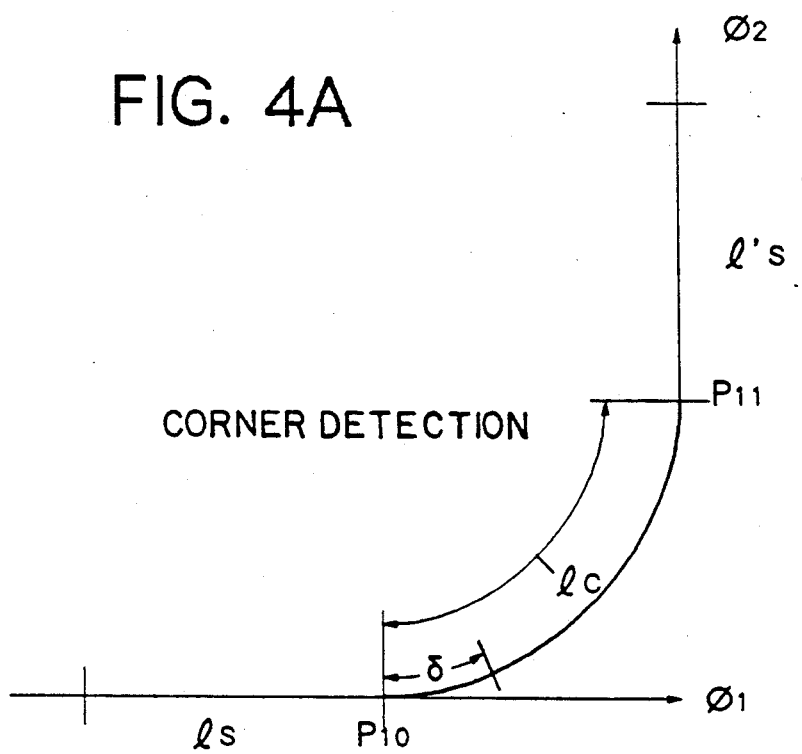
Figure 4B:
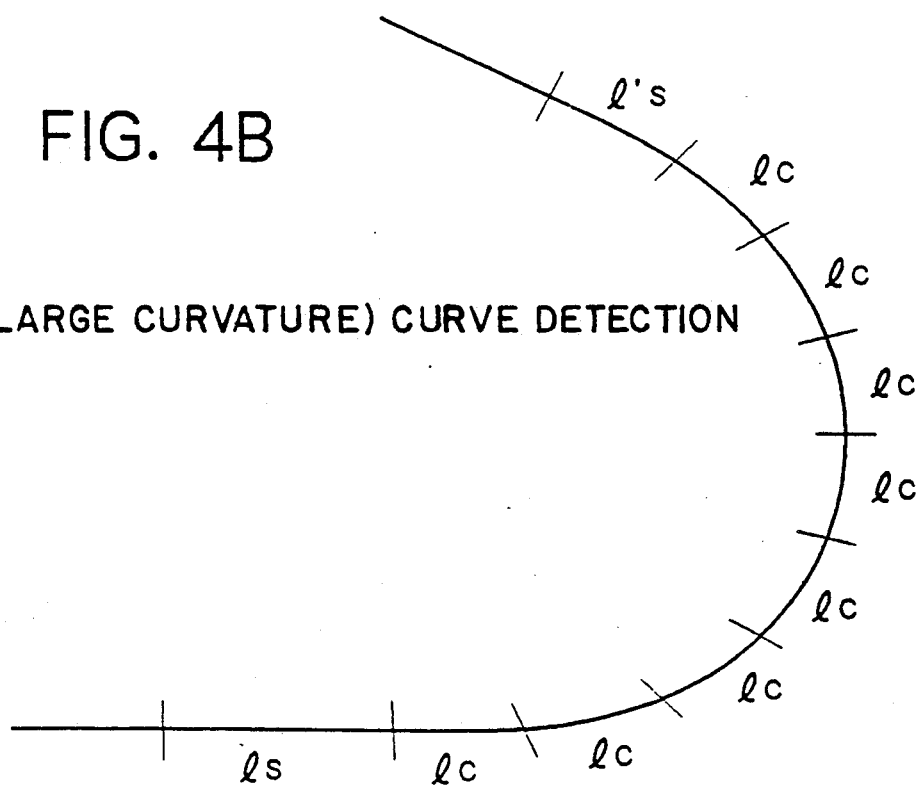
FIG. 4B is a diagram of a principle of detection of a curve having a large curvature.

FIGS. 4A and 4B are diagrams of operation of detecting a corner in accordance with this embodiment. As mentioned above, corner detection is required for navigation during traveling in urban regions. The principle of corner detection in accordance with this embodiment will be described below. A bearing ($\phi_1$ in FIG. 4A) during traveling along a straight line course ($1s$ in FIG. 4A) before a corner is maintained when the vehicle enters the corner. During traveling along a curved path ($1c$ in FIG. 4A), judgement is being made as to whether the vehicle is still traveling along the curved line or starts straight-line traveling. After it has been determined that the vehicle has started traveling along a straight-line ($1s'$ in FIG. 4A), it is determined that turning the corner has been completed on condition that absolute value $\Delta\phi$ of the difference between the stored value of $\phi_1$ and a bearing ($\phi_2$ in FIG. 4A) on the straight line portion $1s'$ of the road after the corner:

$$\Delta\phi = |\phi_2 - \phi_1| \tag{3}$$

is larger than a predetermined value. At this point, the present position is matched with node $N_C$ set at the corner.

Judgment is made to determine whether the vehicle is traveling along a straight line road or curved road as explained below in conjunction with FIG. 5. Assuming that a bearing given each time the vehicle travels through a predetermined distance $\delta$ (e.g., $\delta = 0.4$ m) is Dpi, the running average $\overline{Dpi}$ of data on this bearing is calculated. This averaging is intended to cancel an error in measurement effected by the azimuth sensor (e.g., an earth magnetism sensor 11 shown in FIG. 7). In the example shown in FIG. 5, the running averages of four groups of data items are calculated, and a plurality of running averages are calculated for each of unit sections $1c$. If k running averages are obtained from one section $1c$, the absolute value of the average of deviations of k running averages Dpc is calculated by an equation:

$$\text{Absolute value of deviations} = \frac{\left| \sum_{ij}^{k} (Dpci - Dpcj) \right|}{k} \tag{4}$$

This average of deviations is approximately equal to zero if the corresponding section is a straight-line road, or it has a value other than zero if the section is a curved road. The value of the equation 4 is compared with a predetermined threshold value $\alpha$. If it is larger than $\alpha$, it is determined that the section is constituted by a curved road; if it is not larger than $\alpha$, it is determined that the section is constituted by a straight-line road.

FIG. 4B is a diagram of the principle of control operation for preventing misidentification of a curve having a large curvature with a corner. This operation is necessary for the following reason. Since a large curve is constituted by a number of small curvatures, a number of portions of the curve are recognized as corners if map matching and corner detection method illustrated in FIG. 4A are directly applied. In such a case, there is a need for setting nodes at an unreasonably large number of points.

With respect to a large curve, the overall length of a portion of the road regarded as curved is necessarily considered to be large. That is, as illustrated in FIG. 4B, the curved section has a number of unit sections $1c$ which are determined as curves on the basis of the equation 4. In consequence, whether the section is constituted by a curve or a corner is determined on the basis of the number of sections $1c$ determined as curves.

Calibration of Earth Magnetism Sensor

Figure 6:
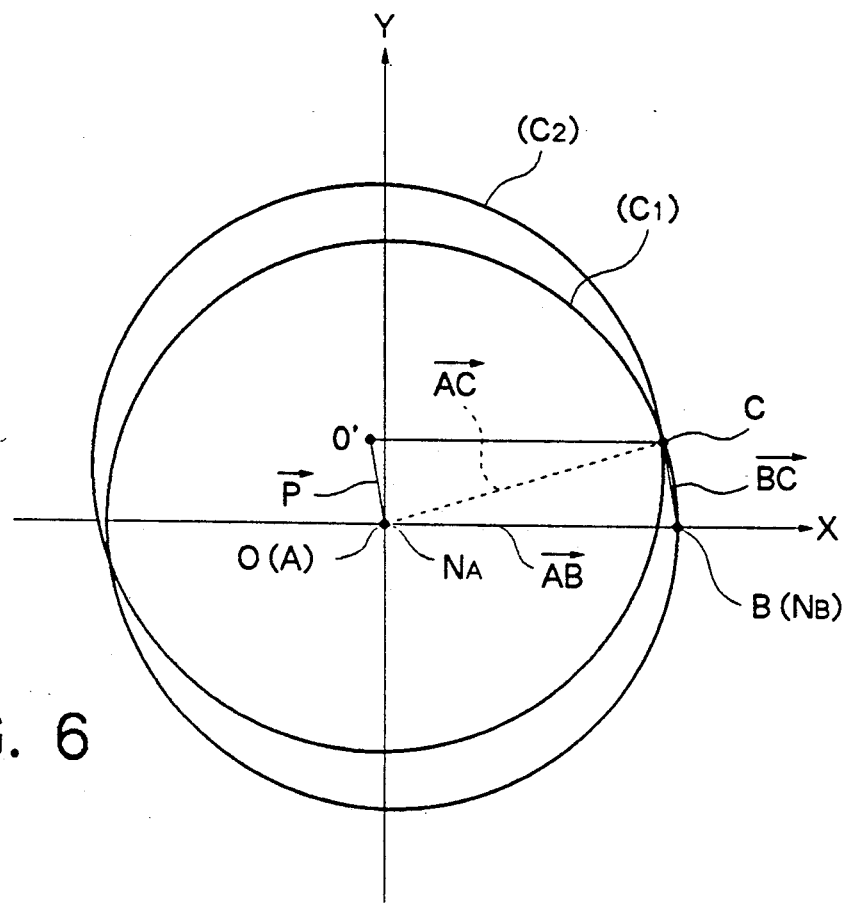
FIG. 6 is a diagram of calibration in the case where a earth magnetism sensor is magnetized.

In this embodiment, an earth magnetism sensor (11 in FIG. 7) is used to detect the direction in which the vehicle is traveling. Generally, earth magnetism sensors have properties of being disturbed by becoming magnetized. FIG. 6 shows a case where there is an error in the bearing detected while the earth magnetism sensor is magnetized.

Referring to FIG. 6, a Lissajous circle $C_1$ is formed by plotting the bearing vector data obtained when the earth magnetism sensor is in a normal state (when it is not magnetized), while a Lissajous circle $C_2$ is formed on the basis of data obtained when the sensor is in a magnetized state. The circle $C_2$ is offset from the circle $C_1$. If the center of the Lissajous circle $C_1$ (intersection of X- and Y-axes) is 0; and a node set at a point A reached lastly by the vehicle is $N_A$, and if the vehicle travels from the point A toward a target point B (arrival node $N_B$) located just east of the point A, the traveling locus of the vehicle detected by the earth magnetism sensor is expressed as a vector $\overrightarrow{AC}$ indicated by the broken line. That is, if a point C corresponds to the position of the target point obtained by dead reckoning, the point C coincides with the point of intersection of the two Lissajous circles, and a vector BC which connects the coordinate position of the point B at which the node NB is located and the coordinate position of the point C obtained by dead reckoning corresponds to the error. If the center of the Lissajous circle $C_2$ is $0'$, a vector $\overrightarrow{P} = \overrightarrow{00'}$ represents the offset. Assuming that the degree of influence of magnetization on the sensor accuracy is small, the offset $\overrightarrow{P}$ can be obtained as follows.

$$\overrightarrow{BC} = \overrightarrow{AC} - \overrightarrow{AB} \tag{5}$$

is established as a simple geometrical calculation. Then, $$\overrightarrow{P} = \overrightarrow{OO'} \approx \frac{|\overrightarrow{BC}|}{|\overrightarrow{AB}|} \cdot \overrightarrow{AC} \tag{6}$$

Because it can be considered that a change in the offset during proceeding from one node to the next node is small, the offset P with respect to the point A is calculated when the vehicle reaches the point B (i.e., node $N_B$), and this value of P can be regarded as the off set at the point B. Before starting from the point B, the reference point for dead reckoning (reference point of the earth magnetism sensor) is corrected by an amount corresponding to the offset P.

Calibration of the earth magnetism sensor is thus performed. This calibration can be performed whenever the vehicle arrives at a node or can be performed on the basis of the driver's choice, thereby enabling an improvement in the accuracy of the determination of the direction in which the vehicle is traveling and, hence, an improvement in the navigation accuracy based on dead reckoning as well as an improvement in the map matching accuracy.

Arrangement of Navigation System

Figure 7:
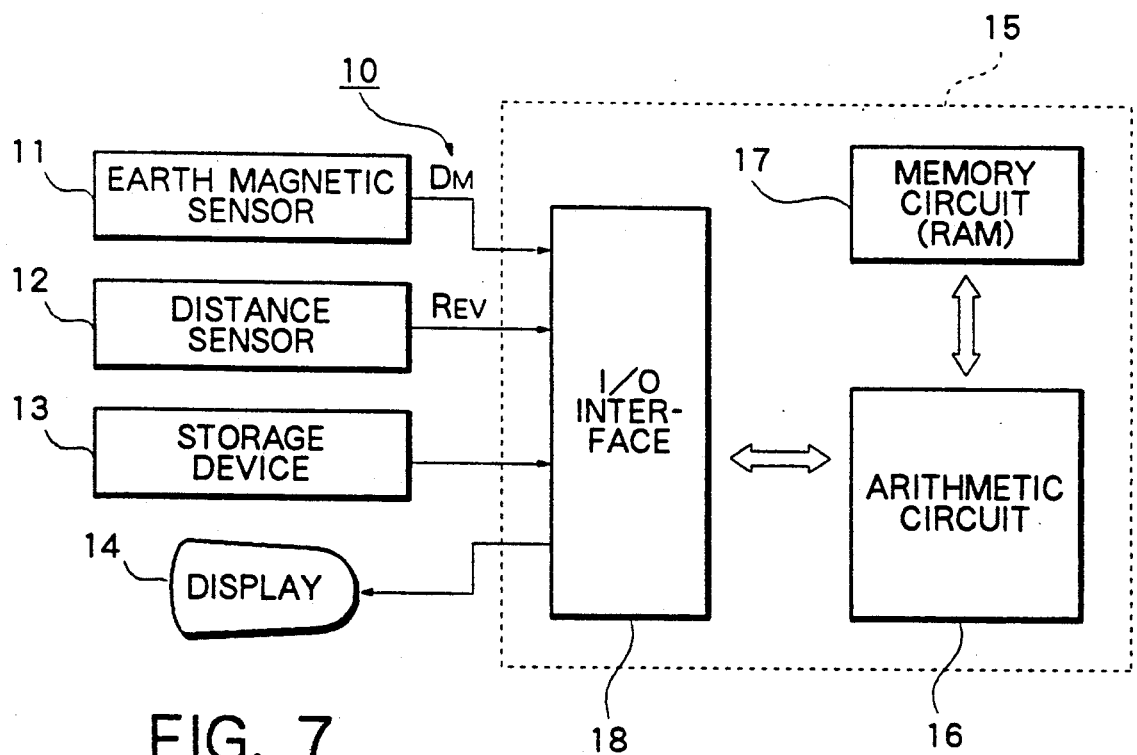
FIG. 7 is a block diagram of a navigation system which represents an embodiment of the present invention.

FIG. 7 shows a diagram of the vehicle navigation system in accordance with this embodiment. The navigation system indicated generally by a reference character 10 has an earth magnetic sensor 11 for detecting the direction in which the vehicle is steered; a distance sensor 12 which outputs a pulse signal each time a vehicle wheel makes a revolution; a map information storage device 13 in which map information on roads and buildings and so on necessary for traveling guidance is stored; a display device 14 constituted by a CRT or the like to display a road map stored as map information in the map information storage device 13, and a control circuit 15. The control circuit 15 has an arithmetic circuit 16, a memory circuit 17 connected to the arithmetic circuit 16, and an input/output interface 18. The earth magnetism sensor 11, the distance sensor 12, the map information storage device 13 and the display device 14 are connected to the arithmetic circuit 16 through the input/output interface 18. The arithmetic circuit 16 incorporates a microcomputer or the like. A signal $D_M$ which represents the direction in which the vehicle is traveling is supplied from the earth magnetism sensor 11 to the arithmetic circuit 16, and a signal $R_{EV}$ which represents the revolutions of the wheel is supplied from the distance sensor 12 to the arithmetic circuit 16, thereby obtaining the distance $L_D$ traveled by the vehicle. The assumed position Px of the vehicle is calculated in the arithmetic circuit 16 from the direction $D_M$ and the travel distance $L_D$, and the results of calculation are temporarily stored in the memory circuit 17. The control circuit 15 is designed to match the assumed position of the vehicle with a most suitable point on a map portion corresponding to the vicinity of the assumed vehicle position by referring to the map stored in the map information storage device 13, to thereby regard this point as the present vehicle position, and to display the same on the screen of the display device 14. The map information storage device 13 may be constituted by a CD-ROM and a CD drive unit for reproduction from the CD-ROM.

Control Procedure

FIG. 8 shows a state of storage in a RAM with respect to flags, intermediate data items and the like used in accordance with a program for controlling the system. These data items will be briefly described below.

The traveled distance obtained by dead reckoning is stored as d. Magnetic course angles measured with the sensor 11 on the basis of earth magnetism are stored as $D_{M1}$ to $D_{Mi}$ in the order of reading with time. The running average of the magnetic course angles is stored as Dp, and values of the magnetic course average Dp successively calculated during traveling of the vehicle are stored by being arrayed as $D_{P0}, D_{P1}, \ldots D_{Pi}, \ldots$ $D_{Pn}$. In this embodiment, the average $D_p$ is calculated after $D_M$ has been measured 32 times.

$$Dp = \frac{\Sigma DM}{32} \quad (7)$$

Px (x, y) represents the vehicle position assumed by calculation based on dead reckoning, and $P_D$ represents a displayed position at which the vehicle position is displayed by the display device 14. $P_C$ represents a position at which a corner which has been passed by the vehicle is recognized as a corner. $P_{OUT}$ represents a position at which deviation from a road in memory is recognized. $N_L$ is a node number which indicates a node which has been reached lastly.

$F_{ON}$ represents a flag for storing the result of judgment as to whether the vehicle is traveling along a road in memory ($F_{ON}=1$) or not ($F_{ON}=0$). FC represents a flag for memorizing detection of passage through a corner of a road. $F_D$ represents a flag for memorizing detection of proceeding into a corner section. $F_A$ represents a flag for indicating that a node is reached.

$N_i$, $\theta_i$ and $L_{Ri}$ constitute an assignable node list used during traveling along a road in memory. Each of these factors are indexed with the suffix i. $N_i$ represents the name of each node, $\theta_i$ represents the bearing from a node ($N_L$) last reached to the assignable node Ni, and $L_{Ri}$ represents the remaining distance between the present position Px and the ith assignable node.

Figure 9A:
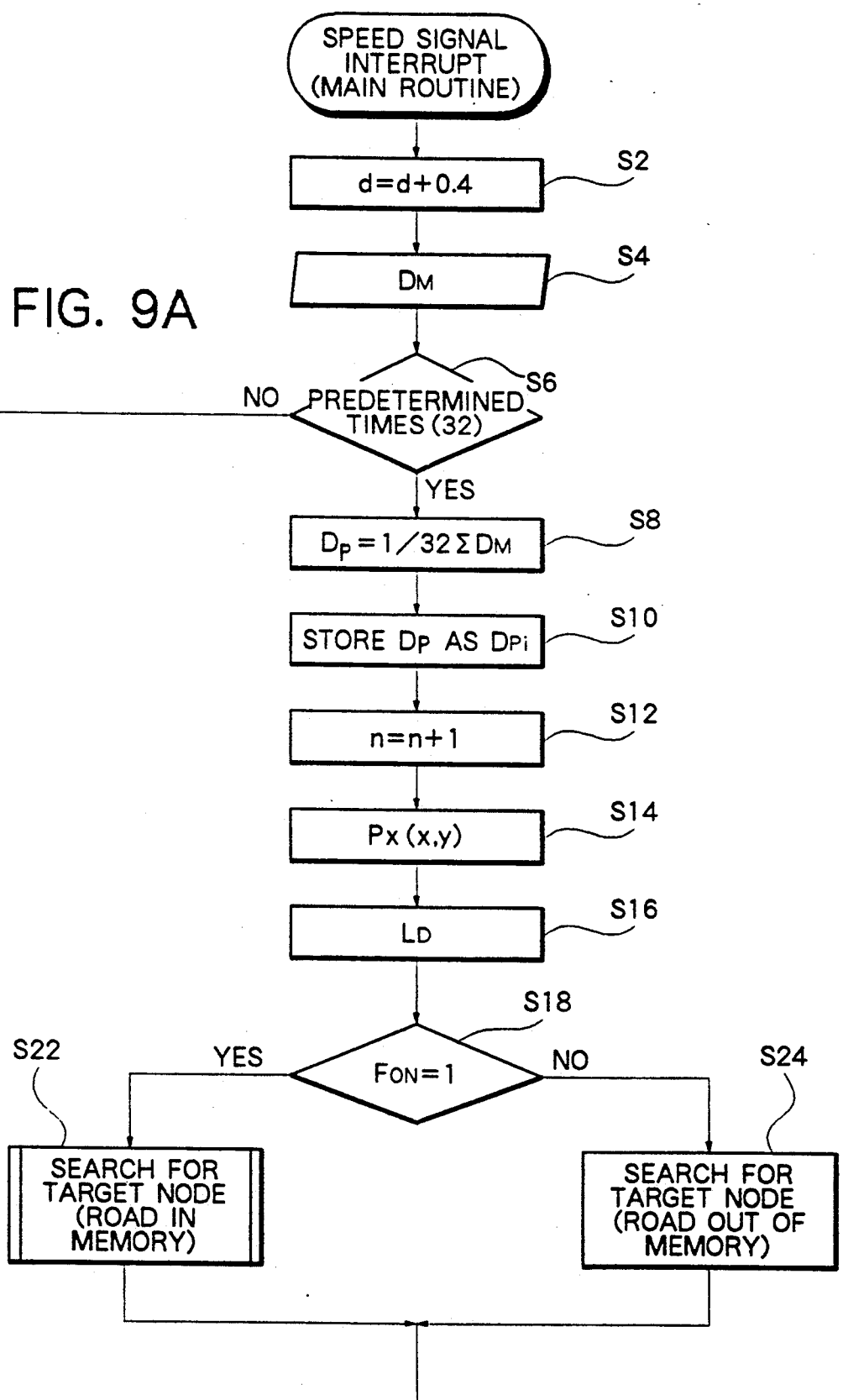
FIGS. 9A and 9B are flow charts of a main routine of the control process in accordance with the embodiment.
Figure 9B:
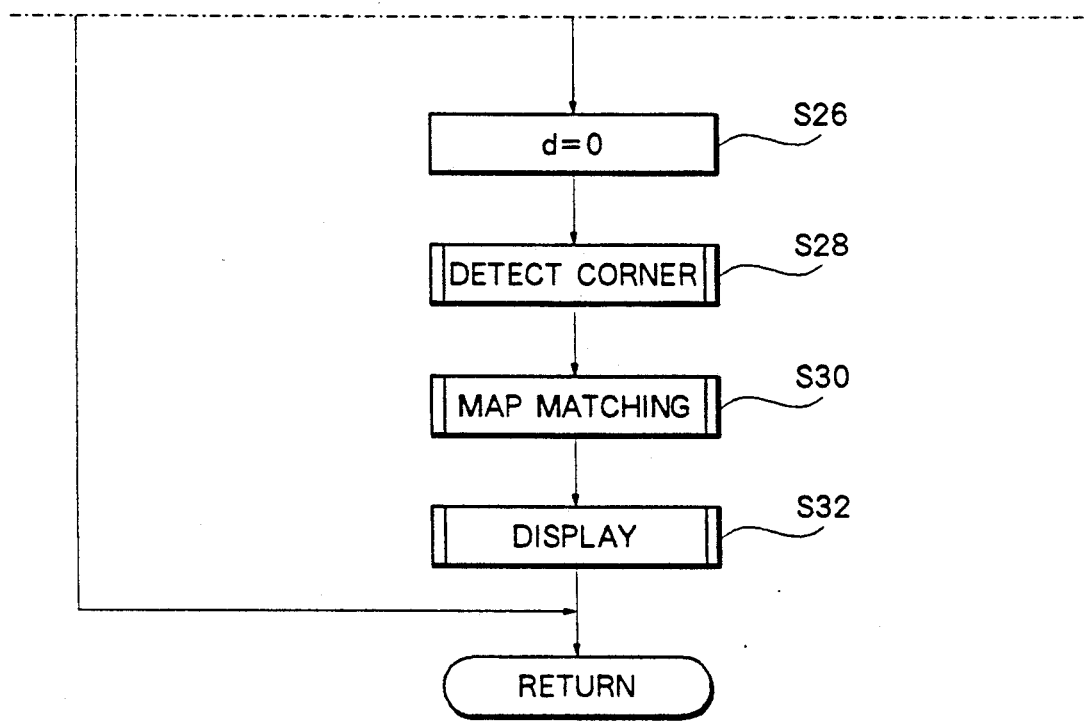
Figure 10:
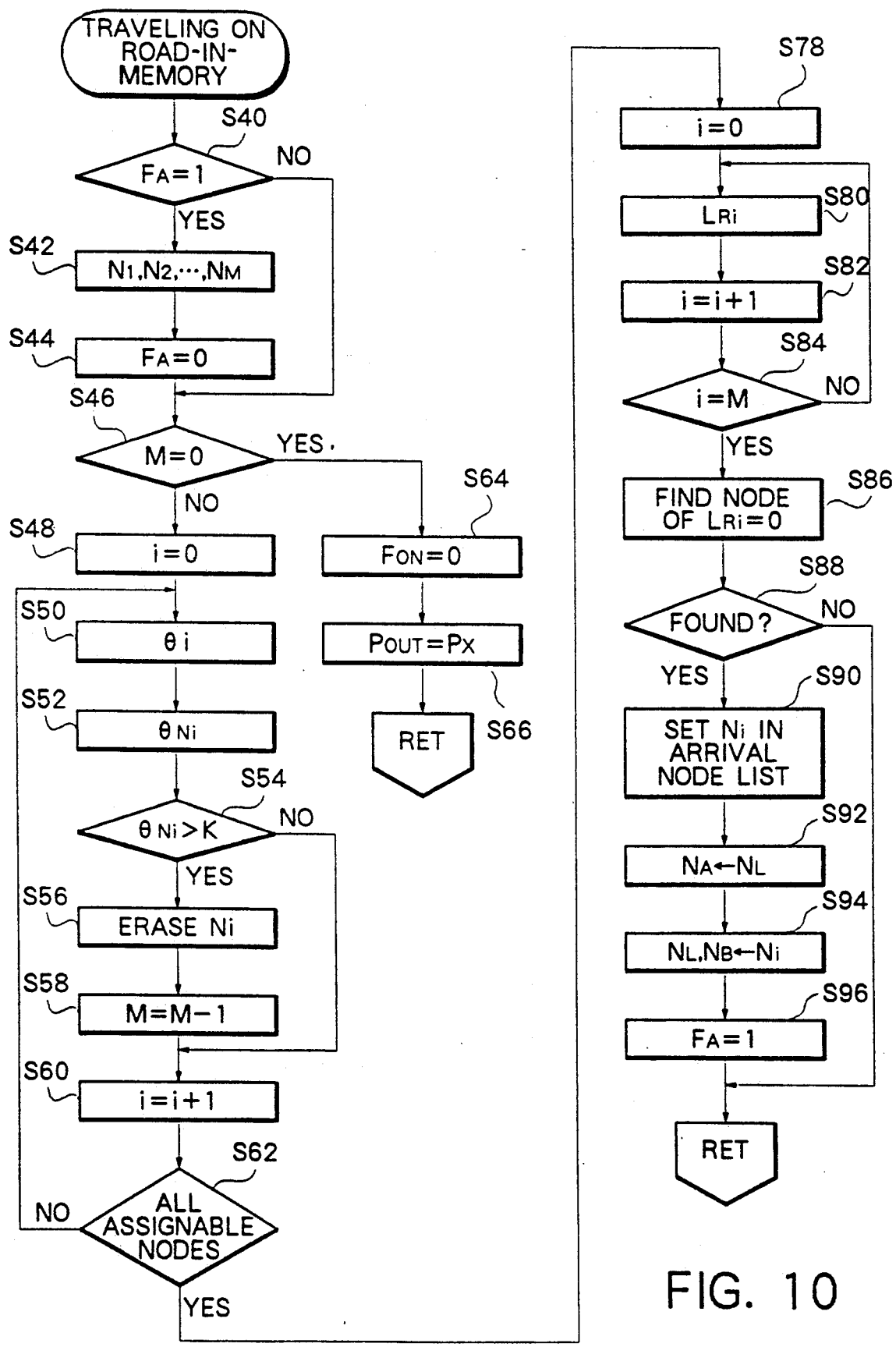
FIG. 10 is a flow chart of a subroutine relating to node search control during traveling on a memorized road.
Figure 11:
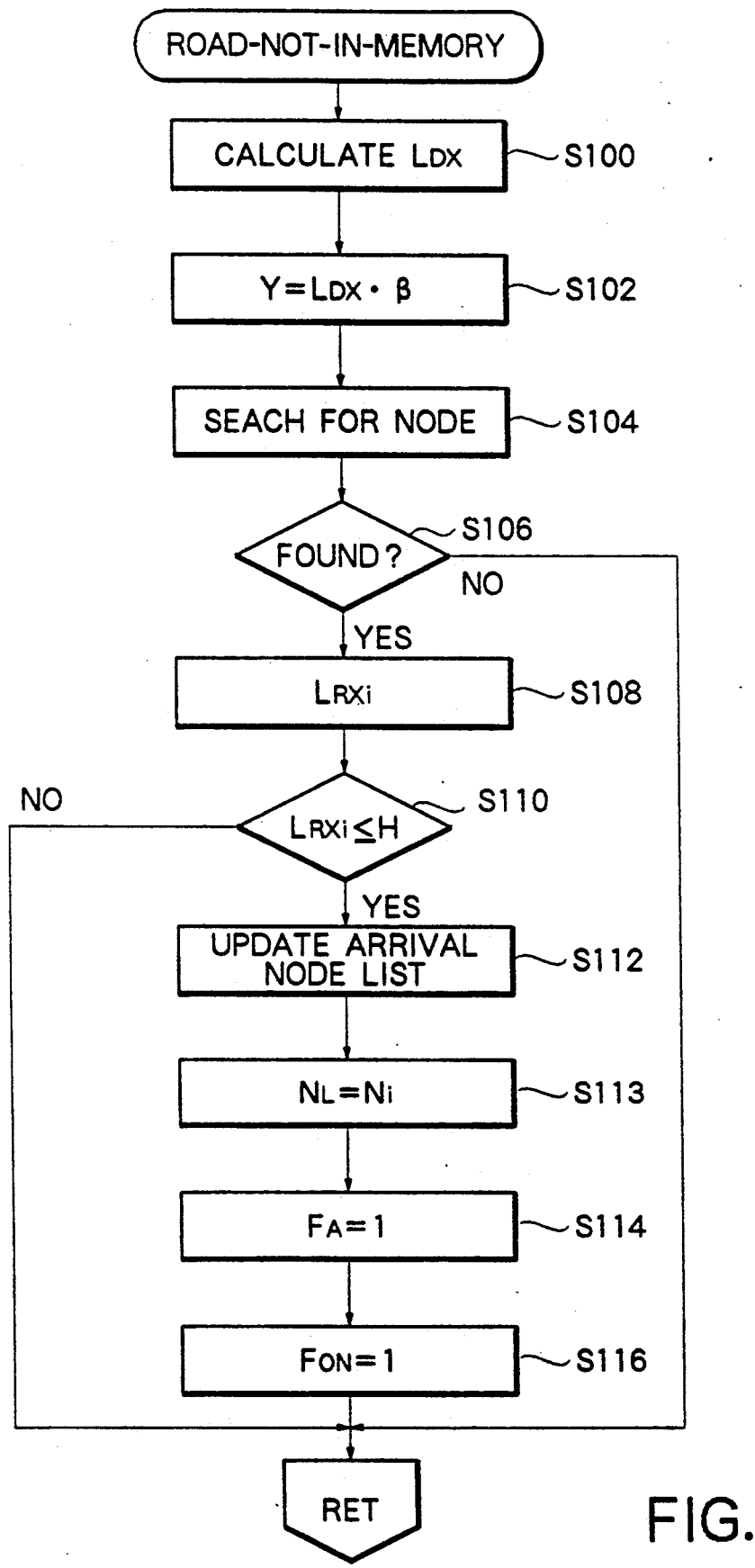
FIG. 11 is a flow chart of the procedure of the node search control during the traveling on a road which is not memorized.
Figure 12A:
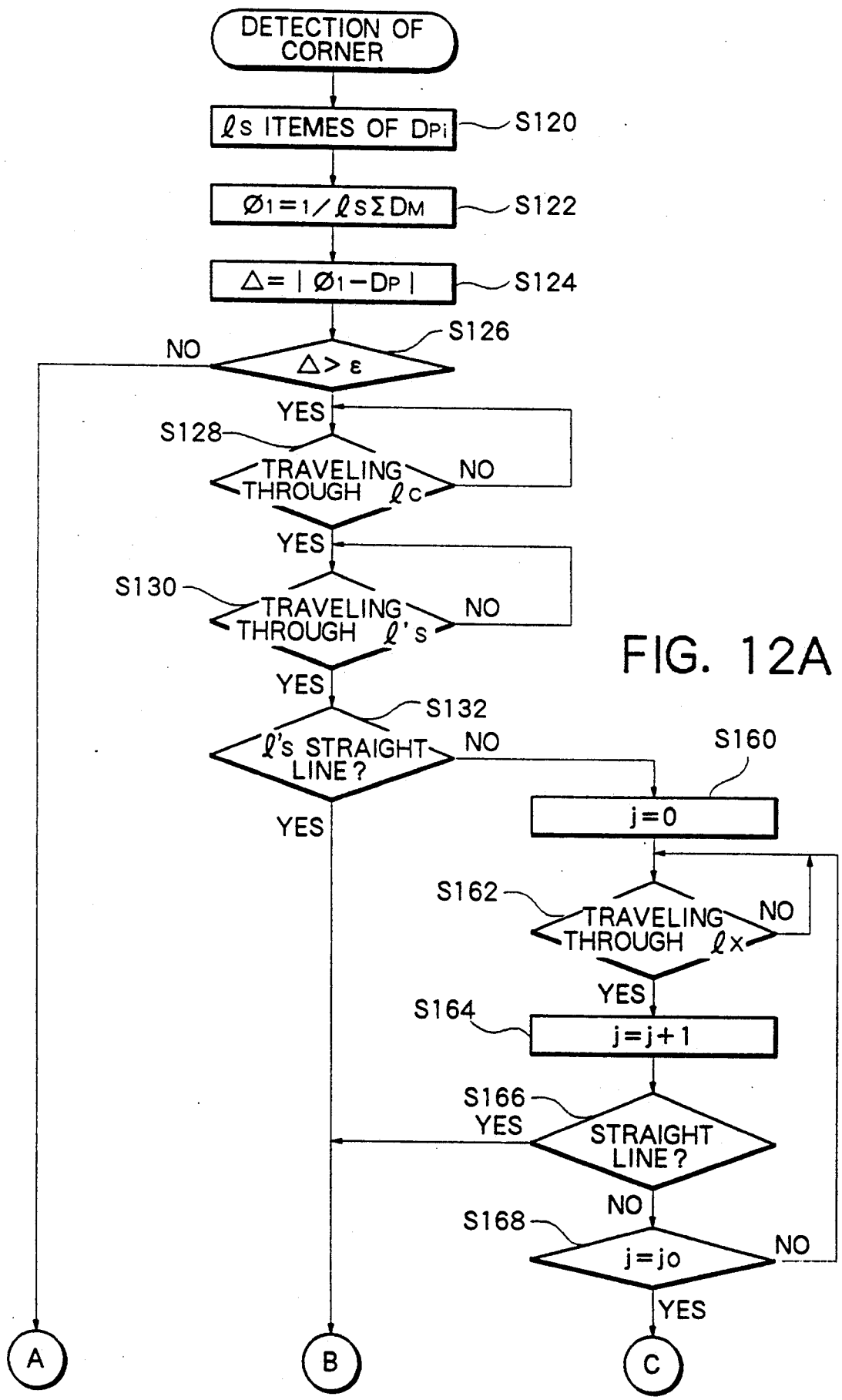
FIGS. 12A and 12B are flow charts relating to corner detection control.
Figure 12B:
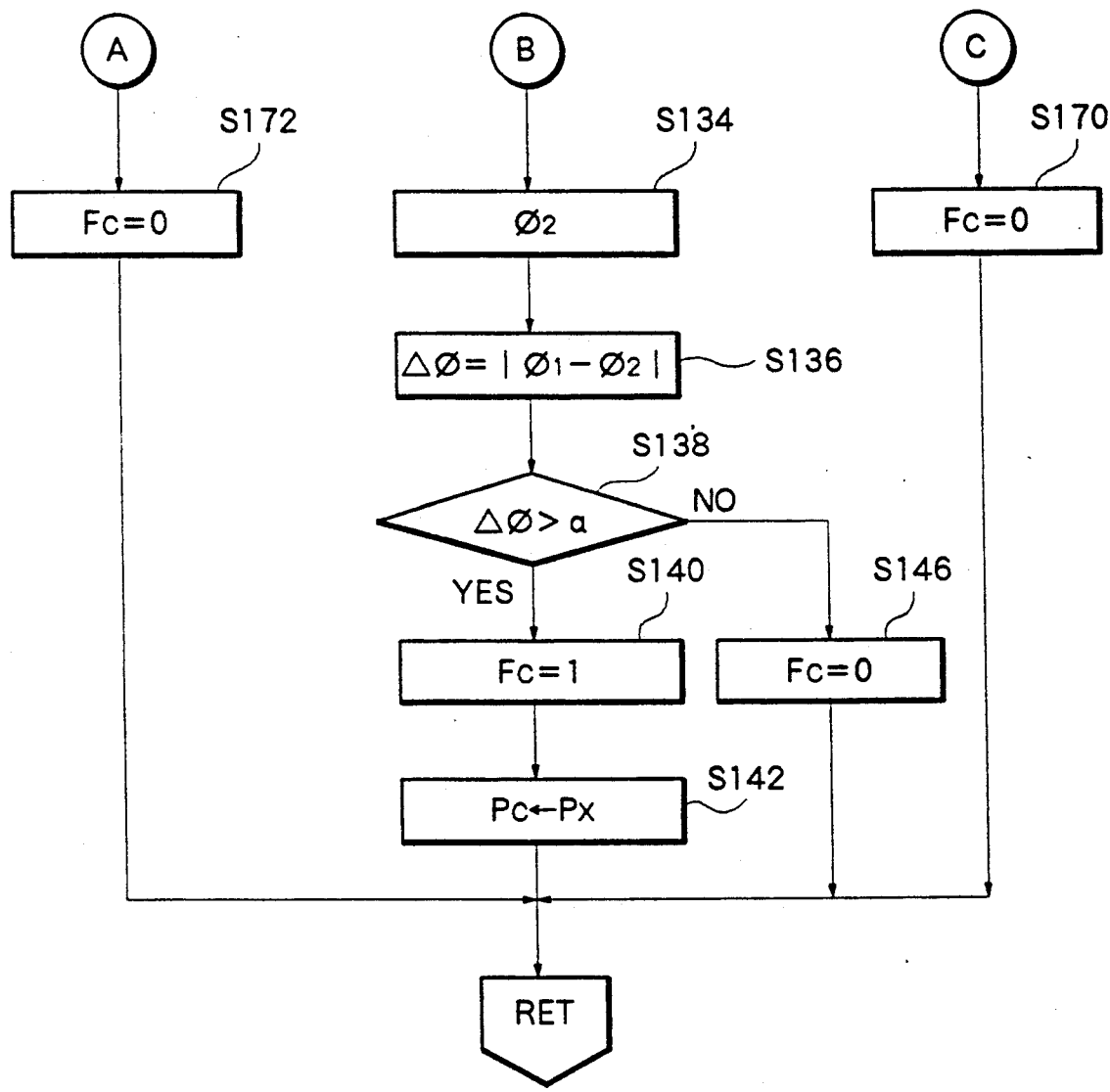
Figure 13:
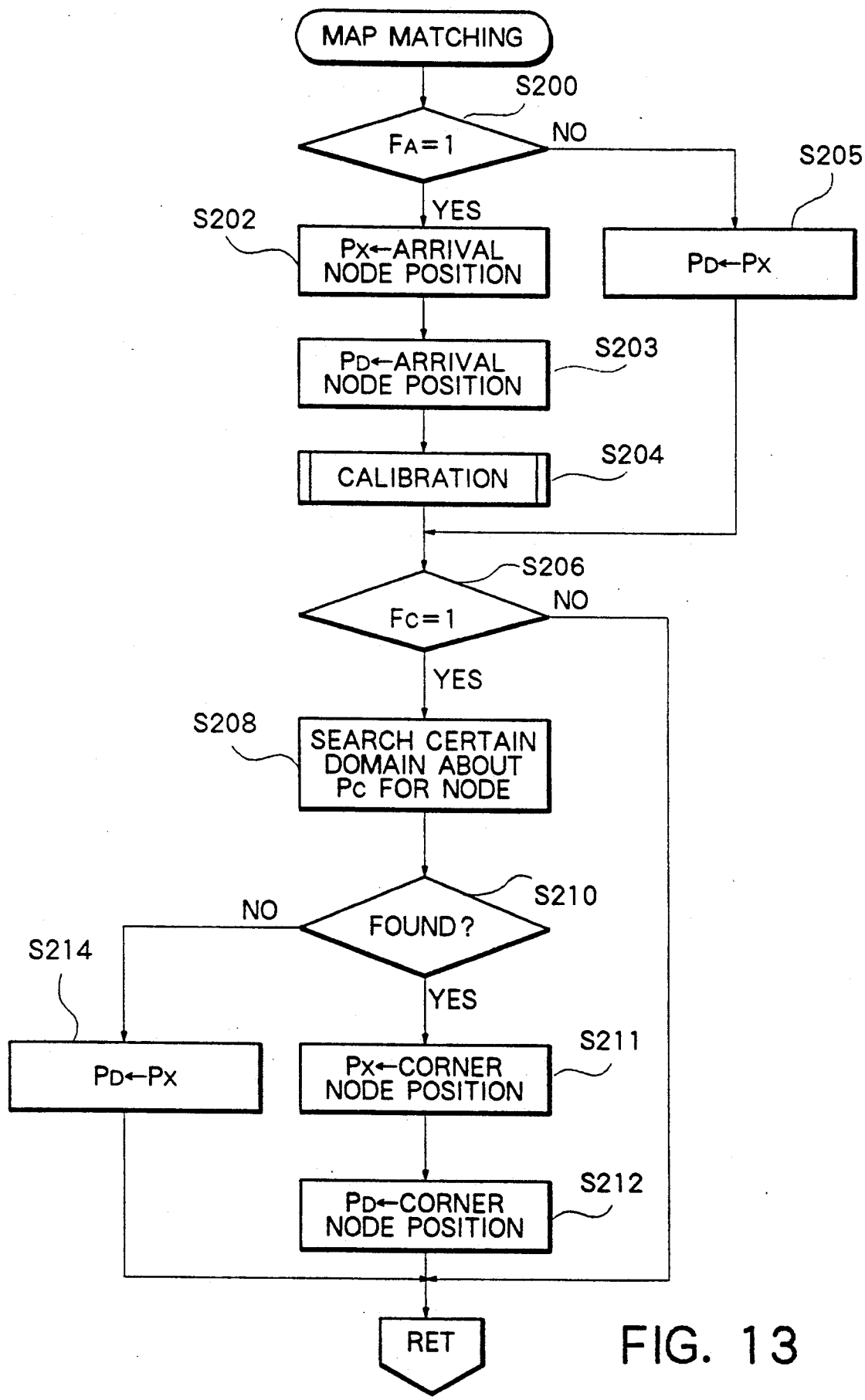
FIG. 13 is a flow chart relating to map matching control.
Figure 14:
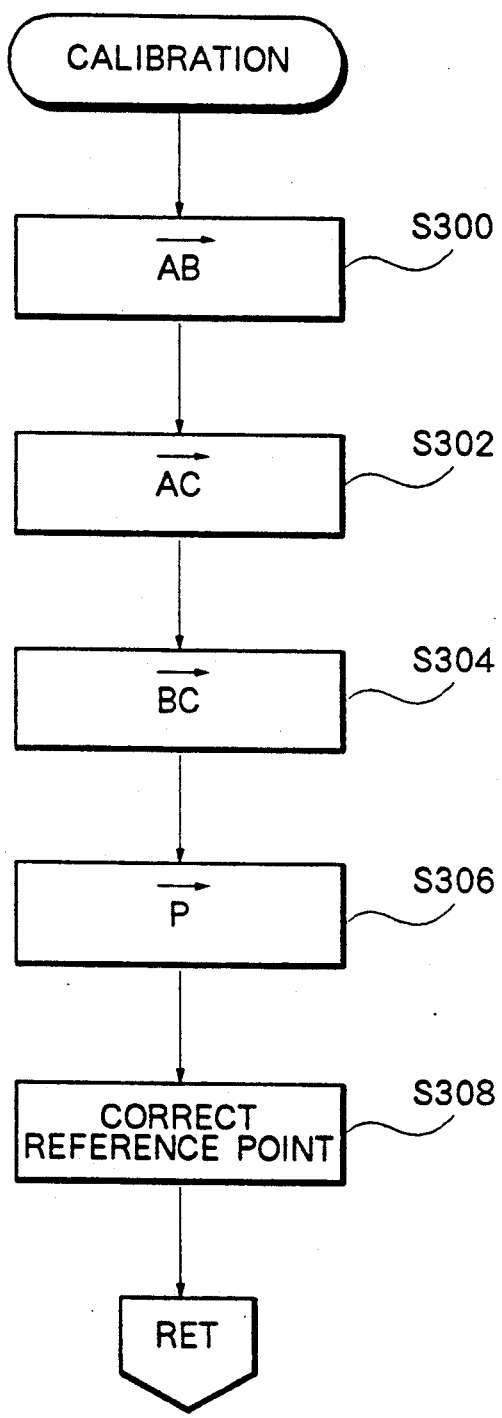
FIG. 14 is a flow chart of the procedure of calibration of the earth magnetism sensor.

FIG. 9 shows a flow chart of the overall navigation control in accordance with the embodiment; FIG. 10 shows a flow chart of a program for a process of node searching when the vehicle is on a road in memory ($F_{ON}=1$); FIG. 11 shows a flow chart of a program for a process of node searching when the vehicle is traveling along a road not in memory; FIG. 12 shows a flow chart of a program for corner detection control; FIG. 13 shows a flow chart of a program for map matching control; and FIG. 14 is a flow chart of a protocol for earth magnetic sensor calibration procedure.

The overall navigation control process will be described first with reference to FIG. 9. The program shown in FIG. 9 is an interrupt routine which is started each time the pulse $R_{EV}$ is supplied from the vehicle speed sensor 12.

In step S2, the distance d traveled by the vehicle is updated. $R_{EV}$ is generated each time the wheel makes one revolution. In this embodiment, it is assumed that the vehicle advances by 0.4 m for one revolution of the wheel. Therefore, $$d = d + 0.4 \ m \quad (8)$$

In step S4, the magnetic course angle DM is read from the earth magnetism sensor 11. In step S6, judgment is made as to whether or not the operation as defined by steps S2 and S4 has been repeated 32 times. Until the $D_M$ is read 32 times, searching for the target node is not conducted while the process returns from step S6 to the main routine.

After 32 items of data on the course angle have been accumulated, the process proceeds to step S8 to obtain the running average Dp of 32 values of the course angle $D_{Mi}$. This running average is obtained by $$Dp = \frac{1}{32} \Sigma DM$$

as mentioned above. For one $R_{EV}$ interrupt, the vehicle advances by 40 cm. After the interrupt has been effected 32 times, the vehicle advances by 12.8 m. That is, the control operation corresponding to step S8 and subsequent steps is started each time the vehicle advances by 12.8 m. The number of repetition times is not limited to 32 and can be changed depending upon the wheel size.

In step S10, Dp obtained in step S8 is stored in the numeric value array $D_{Pn}$. The value of Dp calculated every 12.8 m progression after the node point lastly reached is stored in the numeric value array $D_{Pn}$ until the vehicle reaches the next node. Referring back to FIG. 5, assuming that the value of Dp calculated at the lastly reached node point is $D_{PO}$, the number of values of $D_{Pn}$ is increased as $D_{P1}$, $D_{P2}$ and so on are successively added. The number of values stored at the present time is memorized by a counter n. In step 12, the counter n is incremented.

In step S14, the present position Px (x, y) is calculated by dead reckoning using the sectional travel distance d and the average course angle Dp. In step S16, the distance $L_D$ traveled from the lastly reached node $N_L$ to Px is calculated.

In step S20, whether or not the vehicle is traveling along a road in memory is examined from flag $F_{ON}$. Flags including the flag $F_{ON}$ are previously initialized to zero when the ignition is turned on.

If $F_{ON}$ is "1", target node searching to be conducted during traveling along a road in memory as described above in conjunction with FIG. 2A is started in step S22. FIG. 10 shows details of node searching during traveling along a road in memory. If $F_{ON}$ is "0", node searching to be conducted during traveling along a road not in memory as described above in conjunction with FIG. 3 is started. That is, in a case where the vehicle is deviates from a road in memory, a process of starting dead reckoning at the deviation point and making the vehicle proceed to a road in memory is started. FIG. 11 shows the details of the control for node searching during traveling along a road not in memory.

If, in step S22 or step S24, it is determined that the vehicle has reached the target node, the corresponding node position is memorized. Then, in step S26, the distance d is cleared in order to make the system ready for newly counting the travel distance d in step S2.

In step S28, a corner is detected. If a corner is detected and if a node has been set at the corner, a corner node number attached to this node is stored as corner node $N_C$ by a corner detection routine of step S28. In step S30, map matching is conducted on the basis of the flag $F_A$ which indicates whether or not the vehicle has reached the node. Map matching is not conducted if the vehicle has not reached the node. In step S32, the position Px obtained by dead reckoning is displayed as the vehicle position if the node has not been reached, or the position of the node is displayed as the vehicle position if the node has been reached. A map portion corresponding to the vicinity of the vehicle position is simultaneously displayed by the display.

Next, the procedure of node searching during traveling along a road in memory will be described with reference to FIG. 10. First, in step S40, a judgment is made as to whether the flag $F_A$ indicates that the vehicle has reached a node and that the vehicle starts from the node is "1" or "0". If this flag is "1", it is determined that the vehicle has just reached the node, and nodes to which the vehicle can travel from the lastly reached node $N_L$ in accordance with a node tree such as that shown in FIG. 1B are detected in step S42. The number of nodes thereby detected is set as M, and these nodes are stored as assignable nodes. Assuming that, in the example shown in FIG. 2A, node $N_0$ has been reached last, five nodes $N_1$, $N_3$, $N_5$, $N_7$, and $N_8$, which can be reached, are detected on the basis of the data on the multiplicity of node positions and on connections between the nodes stored as map information in the storage device 13.

In step S44, the flag $F_A$ is set to 0. This is because the vehicle will depart from the lastly reached node $N_L$. In step S46, the number of assignable nodes M=0 is examined. Judgment in step S46 is intended to determine whether or not the vehicle is traveling along a road not in memory. It is not possible that the number of assignable nodes M sought in step S42 is zero at the first time. The number of assignable nodes M is reduced (at step S58) after node searching described above in conjunction with FIG. 2A.

If, as shown in FIG. 3, the last reached node NL is $N_5$, and if it is determined that M=0 in step S46, the flag $F_{ON}$ is set to "0" in step S64. Then, in step S66, the present position Px calculated at step S14 is retained as the point $P_{OUT}$ at which traveling on a road not in memory is recognized, and the process returns to the main program.

If NO is determined in step S46, a counter i for indicating assignable nodes is set to 0. In step S50, the angular difference $\theta_i$ between the direction toward the assignable node $N_i$ and the average Dp of the vehicle traveling direction detected by the earth magnetism sensor 11 is calculated. For instance, as shown in FIG. 2A, angular differences $\theta_8$ and $\theta_7$ between the vehicle traveling direction Dp and nodes $N_8$ and $N_7$ are obtained. With respect to other nodes $N_1 N_3$, and $N_5$, the same operation is also performed. In step S52, the angular difference $\theta_i$ between the traveling direction Dp and the direction toward the assignable node $N_i$ is weighted with the weight W, and is divided by the distance $L_D$ traveled by the vehicle from the lastly reached node, thus calculating the value $\theta_{Ni}$ of the evaluation function 1. As shown in FIG. 2B, the weight function W is previously set with respect to the value of the angular difference $\theta_i$ in such a manner that the value of W increases generally in proportion to the angular difference $\theta_i$. This setting is intended to eliminate assignable nodes $N_i$ at large angles $\theta_i$ to the traveling direction Dp from the group of assignable nodes which can be reached by the vehicle.

In step S54, judgment is made as to whether the value of the evaluation function $\theta_{Ni}$ with respect to ith assignable node is equal to or larger than a predetermined threshold value K. If YES, the corresponding assignable node $N_i$ is eliminated from the group of assignable nodes which can be reached, in step S56, and $M=M-1$ is set in step S58, thereby reducing the number of assignable nodes M. In step S60, the operation as defined by steps S18 to S23 is repeatedly executed with respect to all the rest of assignable nodes $N_i$.

If NO in step S54, the process directly proceeds to step S60 to leave the node as an assignable node because it is possible that the node corresponds to the destination since the traveling direction and the direction toward the node generally coincide with each other.

In the loop from step S78 to step S84, the distance $L_{Ri}$ between the present position Px and the node $N_i$ is calculated with respect to all the rest of assignable nodes $N_i$ which have been recognized as reachable from the assumed present position Px of the vehicle. In step S86, judgment is made as to whether or not there is any assignable node Ni to which the remaining distance $L_{Ri}$ is substantially zero.

If one of the nodes $N_i$ from which a value of $L_{Ri}$ substantially equal to zero is calculated is found in step S86, it is determined that the vehicle has reached the target node, and that node $N_i$ is newly added to a list of nodes reached by the vehicle, in step S90, because that node is considered to be the node of destination point. Thereafter, in step S92, the node number of the node reached at the preceding time (retained as $N_L$) is stored as $N_A$, and the node number of the node newly reached is stored so as to update $N_L$ and $N_B$. In step S96, the flag $F_A$ that indicates that the vehicle has arrived at the node is set to 1, and the process returns to the main routine. $N_A$ and $N_B$ are used for calibration of the earth magnetism sensor 11 when the same is magnetized. (Refer to the flow chart of FIG. 14.)

The node search control during traveling along a road in memory is thus conducted.

Figure 15:
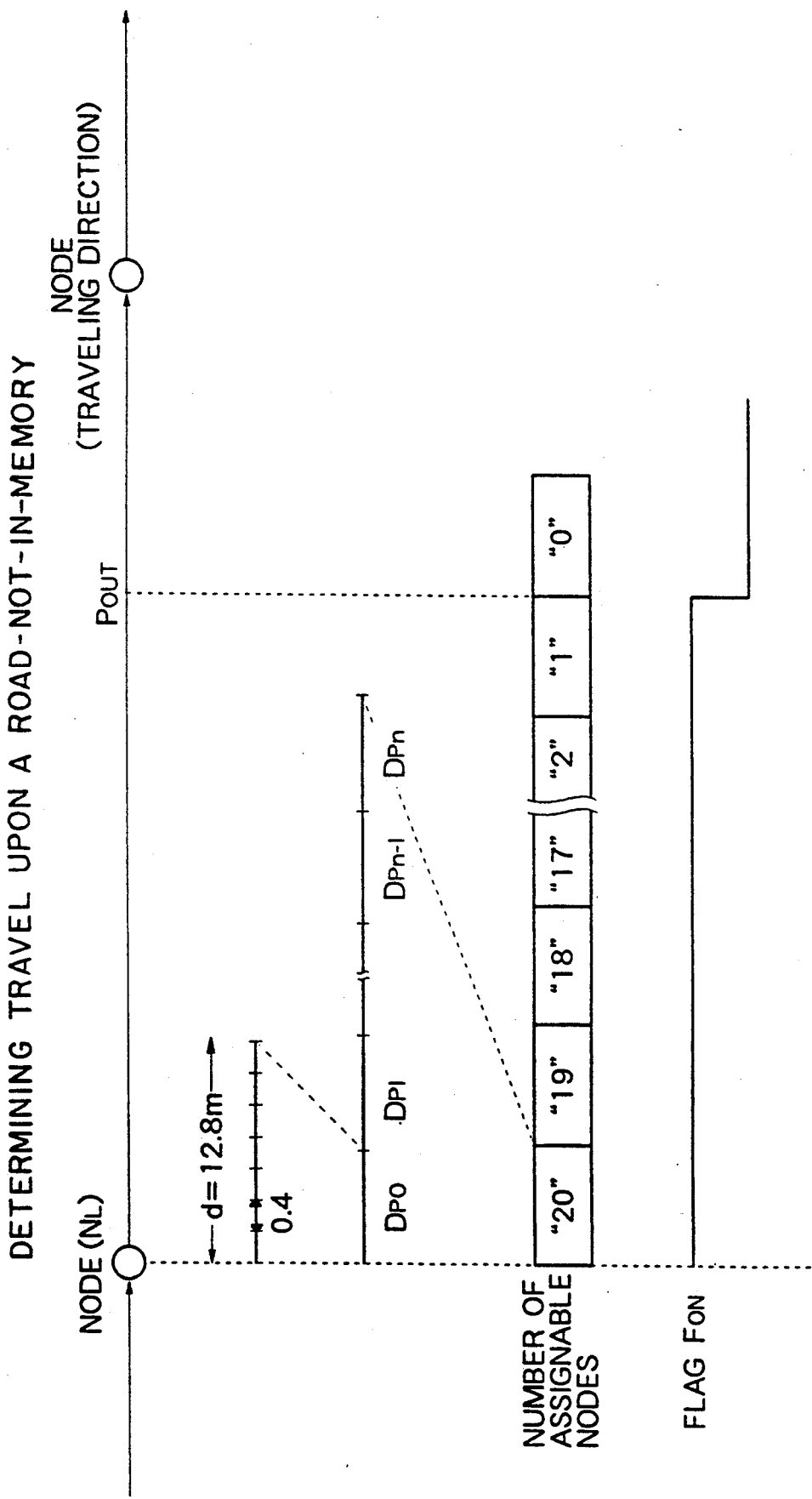
FIG. 15 is a schematic diagram of control operation for traveling from a memorized road to a road which is not memorized.

If the vehicle is traveling along a road not in memory, the number of assignable nodes M becomes naught some time or other, as described above in conjunction with FIG. 3. This state is detected in step S46, and the flag $F_{ON}$ is set in step S64. In step S66, the present position Px calculated in step S14 is retained as the point $P_{OUT}$ at which traveling along the road not in memory has been recognized, and the process returns to the main program. FIG. 15 shows part of the process until the flag $F_{ON}$ is reset in a case where the number of assignable nodes M at the start from the lastly reached node $N_L$ is 20. During the procedure from step S46 to step S62, nodes which have been judged to be impossible to select as the target node are eliminated from the group of assignable nodes, and the flag $F_{ON}$ is reset after the number of assignable nodes has become naught.

Once it is recognized that the vehicle is traveling along a road not in memory, this recognition is maintained as flag $F_{ON}=0$. Then, in the main routine of FIG. 9, a node search routine of step S24 for traveling along a road not in memory is executed.

Next, the procedure of control for node searching during traveling along a road not in memory will be described with reference to FIG. 11.

As already described above in conjunction with FIG. 3, dead reckoning is newly started from the point $P_{OUT}$ of deviation from the road in memory (which has been stored in step S64 of FIG. 10). In step S100 of FIG. 11, the distance $L_{DX}$ traveled by the vehicle from $P_{OUT}$ is calculated. In step S102, the traveled distance $L_{DX}$ is multiplied by the predetermined reference value $\beta$ in accordance with the equation 2, thereby setting the radius r (corresponding to $r_1$ or $r_2$ shown in FIG. 3) which defines the range of node searching. Then, in step S104, searching for nodes Ni within the area defined by the radius r is conducted on the basis of the assumed vehicle position. In step S106, judgment is made as to whether or not any node is located within the searching area.

If NO in step S106, the process directly proceeds to the main routine. This state corresponds to the case shown in FIG. 3, where no node is found in the circle having radius $r_1$ when the vehicle reaches the point $P_1$. If YES in step S106, the distance $L_{RXi}$ between the node $N_i$ within the searching area of the radius r and the assumed vehicle position Px is calculated. In step S110, judgment is made as to whether or not $L_{RXi}$ is equal to or smaller than a predetermined value H which is a constant value approximate to zero. In the example shown in FIG. 3, node $N_7$ is found within the circle of the radius $r_2$ when the vehicle advances to the point $P_2$. Since at this time the remaining distance $L_{RX7}$ is not approximate to zero, it is not determined that the vehicle has arrived at node $N_7$ when the vehicle reaches the point $P_2$. If, in step S110, a plurality of nodes to which the remaining distances $L_{RX7}$ are equal to or smaller than H are found, one of these nodes closest to the point is recognized as the node to be reached.

It is thereby recognized that the vehicle has reached a node on a road in memory after traveling along the road not in memory. At this time, the reached node $N_i$ is added to the reached node list while the lastly reached node number $N_L$ is updated, and the flag $F_A$ is set to 1 in step S114. In step S116, the flag $F_{ON}$ is set to 1 in order to store in memory that traveling along a road in memory is restarted.

Next, the procedure of control for corner detection processing the outline of which has already been described above in conjunction with FIGS. 4A, 4B and 5 will be described below in detail on the basis of flow charts of FIGS. 12A and 12B.

First, in step S120, the course angle $\phi_1$ averaged from signals $D_M$ from the earth magnetism sensor 11 corresponding to the predetermined distance $1s$ lastly traveled by the vehicle is calculated:

$$\phi 1 = \frac{\Sigma D_M}{1s} \quad (9)$$

The number of values of DM necessary for the calculation of $\phi_1$ depends upon the level of noise contained in the output from the earth magnetism sensor 11.

In step S124, the difference $\Delta$ between $\phi_1$ and the magnetic course signal DM obtained at the present point (step S4) is calculated:

$$\Delta = |\phi_1 - D_M| \quad (10)$$

In step S126, judgment is made as to whether or not $\Delta$ is larger than a predetermined value $\epsilon$. If $\Delta > \epsilon$, it is considered that the vehicle has just turned by $\Delta$ after traveling through $1s$.

If NO is the result of the judgment in step S126, i.e., if it is determined that $1s$ traveled by the vehicle is a straight-line line path, the flag $F_C$ is set to 0 in step S172, and the process returns to the main routine. If YES in step S126, i.e., if it is determined that the vehicle started turning a corner, the process proceeds to step S128.

In the control procedure from step S128 to step S132, judgment is made as to whether or not the vehicle enters a straight line road $1s'$ after passing through the corner path $1c$, as described above in conjunction with FIG. 4A. The loop formed between step S160 and step S168 corresponds to the procedure of control for preventing misidentification of a large curve with a corner, as described above in conjunction with FIG. 4B.

In step S128, completion of traveling the distance $1c$, such as that shown in FIG. 4A, regarded as equal to or larger than the length of the corner, is determined. After the vehicle has traveled through $1c$, the completion of traveling through the predetermined distance $1c'$, after turning the corner is determined in step S130. It is assumed that, along with step 130 the determining of waiting the completion of traveling through the distance $1c'$, the $D_M$ obtained each time the vehicle advances by 0.4 m is stored in the memory shown in FIG. 8.

In step S132, the absolute value of the deviation of the course angle is calculated by the equation 4, and this value is compared with a predetermined constant, thereby judging whether or not the section $1s'$ is straight. If YES in step S132, $1s$ is regarded as corresponding to the curve of a corner, and the course angle $\phi_2$ averaged from values of $D_M$ corresponding to the traveled distance $1s'$ is calculated in step S134:

$$\phi_2 = \frac{\Sigma D_{Mi}}{1s'} \quad (11)$$

In step S136, the difference $\Delta\phi$ between the course angle $\phi_1$ averaged during traveling through the predetermined distance $1s$ before turning the corner and the course angle $\phi_2$ averaged during traveling through the predetermined distance $1s'$ after turning the corner is calculated by the equation 3. In step S138, a judgment is made as to whether or not $\Delta\phi$ is equal to or larger than the predetermined value $\alpha$.

If $\Delta\phi > \alpha$ is determined in step S138, it is determined, in step S140, that the vehicle has turned the corner, the flag $F_C$ is set to 1, and the process returns to the main routine. If $\Delta\phi \leq \alpha$ as determined in step S138, the flag $F_C$ is set to 0 in step S146, and the process thereafter returns to the main routine.

Next, the control for preventing the misidentification of a large curve as a corner will be described below. Since, as described above in conjunction with FIG. 4B, curved paths $1c$ are successively found in a large curve, the result of the decision in step S132 of FIG. 12A is NO, and the process proceeds to the loop formed between step S160 and step S168. In step S162, completion of traveling through a section $1x$ is determined. The distance $1x$ is equal to the distance $1c$.

In this embodiment, a large curve is identified if the occurrence of curved path $1c$ is successively detected jo times, as shown in FIG. 4B. That is, after a counter j for counting this number of repetition times has been set to 0 in step S160, it is confirmed, in step S162, that the vehicle has traveled through the predetermined distance $1x$. Thereafter, in step S164, j is set to $i+1$. In step S166, the deviation of the course angle within the section $1x$ is calculated by the equation 4, thereby judging whether or not the section $1x$ is straight. If it is thereby determined that the section is curved, the process returns to step S162, thereafter repeating the above-described procedure with respect to the section $1x$.

If, in step S166, it is determined that the section $1x$ is straight before the section $1x$ is recognized as the curved section $1c$ jo times, it is determined that the vehicle has entered a straight path after turning the corner. Then, step S134 and other steps subsequent to step S134 are conducted.

The procedure of corner detection and the procedure for preventing the misidentification of a large curve with a corner are thus provided.

Next, map matching processing effected in step S30 will be described in detail with reference to the flow chart of FIG. 13.

The node arrival flag $F_A$ and the corner detection flag $F_C$ relates to the map matching control.

When $F_A = 0$ and $F_C = 0$

The vehicle is traveling along a road in memory or a road not in memory and is passing a point between nodes. At this time, the position Px (x, y) calculated on the basis of dead reckoning in step S14 is set in step S205 as the position $P_D$(x, y) displayed by the display device 14.

When $F_A = 1$

The vehicle has reached a node during traveling along a road in memory (step S96), or the vehicle has reached a node on a road in memory after traveling along a road not in memory (step S114). In these cases, the present vehicle position Px (x, y) is corrected to the coordinate position (stored) for the reached node, in step S202. Then, in step S203, the position of the reached node is set as the displayed position $P_D$.

In step S204, calibration processing (FIG. 14) for correcting the reference position of the earth magnetism sensor 11 is conducted.

When $F_C = 1$

At this time, a corner is detected. In step S208, a judgment is made as to whether or not there is any node within a certain area (e.g., a circular area) formed around the position PC (x, y) of the corner detected in step S142. If there is no such node, the position Px (x, y) calculated on the basis of dead reckoning in step S14 is set in step S214 as the position $P_D$(x, y) displayed by the display device 14.

As described above, navigation control is performed in a suitable way during traveling along a road in memory or a road not in memory, at the time of arrival at a node, or during traveling a corner.

Next, control for calibration of the earth magnetism sensor effected in step S204 will be described with reference to FIGS. 14 and 6.

In step S300, the distance between the points A and B shown in FIGS. 6 is calculated. That is, the distance between the position Px calculated by dead reckoning and the reached node $N_B$ (stored in step S94) is calculated. In step S302, the distance between the points A and C, i.e., the distance between the node $N_A$ (stored in step S92) and the node $N_B$ is calculated. In step S304, the distance between the points BC is calculated by the equation 5. In step S306, the vector $\vec{P}$ is calculated by the equation 6. Then, in step S308, the vector P is reduced to X. and Y-components of the earth magnetic sensor 11, and the amount of correction is calculated therefrom with the reference point ◯ of the earth magnetism sensor 11 used as a datum. The offset correction of the reference point ◯ of the earth magnetic sensor 11 is effected on the basis of the amount of correction calculated.

This calibration control ensures that the degree of error due to magnetization of the earth magnetism sensor 11 is corrected each time the earth magnetism sensor 11 passes a node, thereby improving the accuracy with which the direction in which the vehicle is traveling is detected by the earth magnetism sensor 11. Subsequent map matching can therefore be performed correctly.

Effects of the Embodiment

The above-described embodiment of the navigation system has the following effects, A to I.

A: The system utilizes not only the nodes provided at distinctive points on the map but also the nodes disposed at desired intervals on roads (not always regularly), thereby enabling execution of map matching before the amount of error in the assumed position calculated by dead reckoning becomes too large, that is, preventing misidentification of the present position with a wrong node in map matching. Moreover, the error is canceled by map matching, and the desired accuracy of subsequent dead reckoning and map matching is thereby maintained.

B: In accordance with the control procedure shown in FIG. 10, nodes (assignable nodes) which are considered to be logically possible to reach by the vehicle from a node tree are sought during operation in the road-in-memory travel mode, and nodes which seem to be different from the target node are eliminated from the group of assignable nodes, thereby enabling the target node to be positively identified. That is, unlike conventional map matching navigation, assignable nodes are eliminated on the basis of comparison between the direction from the present point Px (x, y) to the assignable node $N_i$ and the direction in which the vehicle is traveling, thereby facilitating elimination of assignable nodes while maintaining the accuracy with which the target node is identified. In this system, therefore, map matching is free from misidentification with a wrong node.

C: A notion of nodes is introduced, and, in accordance with the control procedure shown in FIG. 11, map matching is inhibited until it is recognized that the vehicle has reached a node on a road in memory, thereby preventing matching with a wrong road particularly when the vehicle is traveling along a road not in memory, which problem is often encountered in the conventional map matching process.

D: Control operation of step S46 of FIG. 10 and other steps enables recognition of traveling along a road not in memory, which has not been performed in the conventional system.

E: The control procedure shown in FIGS. 12A and 12B enables detection of passage through a corner, which has not been performed in the conventional system. At the same time, misidentification of a large curve with a corner can be prevented.

If a node is provided in the vicinity of a corner, the accuracy with which the corner is detected and, hence, the accuracy of map matching is improved.

F: The control procedure shown in FIG. 14 enables prevention of any reduction in the accuracy of the earth magnetism sensor due to magnetization and hence to improve the accuracy in map matching navigation.

G: The control procedure shown in FIG. 11 enables proceeding from a road not in memory to a road to be recognized positively. The need for memorizing all roads in the storage device is thereby eliminated, thereby reducing the memory capacity while maintaining the map matching accuracy.

H: To eliminate nodes during traveling along a road in memory, calculation of the evaluation function $\theta_{Ni}$ is performed after weighting depending upon the directional difference $\theta$ has been effected, thereby improving elimination accuracy.

I: While nodes (assignable nodes) which can be reached during traveling along a road not in memory are being sought, the node search range is extended depending upon the traveled distance based on dead reckoning (step S102), thereby reducing the possibility of the target node escaping from the search range even though dead reckoning inevitably involves an error.

Example of Modification

The present invention can be modified in various ways without departing from its spirit and scope.

Figure 16:
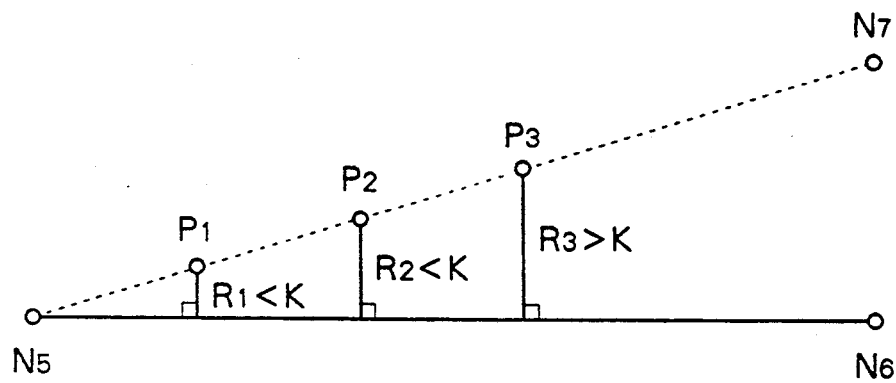
FIG. 16 is a diagram of another method of recognizing traveling on a road which is not memorized.

In the above-described embodiment, proceeding from a road in memory to a road not in memory is recognized when the number of assignable nodes becomes naught. In a modified example described below, such a change is recognized depending upon whether or not the distance R between the present point Px(x, y) obtained by dead reckoning and the road in memory has exceeded a predetermined value K, as shown in FIG. 16. As shown in FIG. 1A, a road not in memory extends between nodes $N_5$ and $N_7$. In the example shown in FIG. 16, the vehicle starts from node $N_5$ and travels along this road not in memory. As the vehicle passes points $P_1$ to $P_3$ on the road not in memory, the distance R between each point on the road not in memory and the road in memory between nodes $N_5$ and $N_6$ is determined.

R is calculated as described below. It is assumed that the road in memory between nodes $N_5$ and $N_6$ is generally straight. A perpendicular to the assumed straight line is drawn from each point P, and the distance between the point P and the point of intersection of the perpendicular and the assumed straight line is calculated as R.

Figure 17:
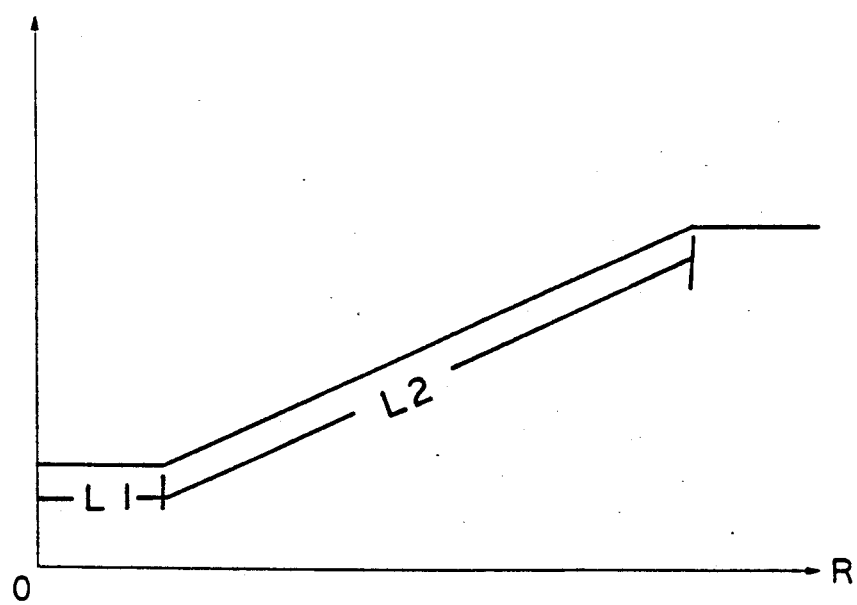
FIG. 17 is a diagram of a characteristic of a threshold value K used in the method shown in FIG. 16.

The coefficient K to be compared with R is determined so as to change on the basis of the distance $L_D$ traveled from the node at which matching has been effected last (node $N_5$, in the example shown in FIG. 16), as shown in FIG. 17. As represented by the characteristic line in FIG. 17, K is constant until a distance $L_1$ is traveled, gradually increases until a distance $L_2$ is traveled after traveling through $L_1$, and becomes constant after traveling through $L_2$. In this modified example, K defined by this characteristic and R are compared. When $$R > K$$

it is determined that the vehicle is traveling along a road not in memory. After the distance $L_D$ traveled from the node at which matching had been effected last has exceeded $L_1$, the value of K becomes greater as $L_D$ increases, thereby increasing restriction on determination of traveling along a road not in memory. This is because it is necessary to prevent traveling along the road in memory from being confused with traveling along the road not in memory, since errors entailed by dead reckoning are accumulated as the traveled distance increases.

In this modified example, judgment as to when the vehicle restarts traveling along a road in memory should be considered. For example, a predetermined search area such as a circle of a radius r such as that shown in FIG. 3 may be defined, and restarting traveling along a road in memory may be recognized when the distance between the vehicle position and a node located within this area becomes substantially equal to zero. Instead, the corner detection procedure shown in FIG. 12 may be used in such a manner that restarting traveling along a road in memory is recognized when a predetermined corner at which a node is set is detected.

It is to be understood that the present invention includes other various modification and changes construed within the scope of the invention defined in the appended claims.

What is claimed is:

1. An apparatus for navigating a vehicle, comprising:
   direction detection means for detecting the direction in which the vehicle is traveling;
   distance detection means for detecting the distance traveled from a start node;
   vehicle position assuming means for assuming the present position of the vehicle relative to a reference position on the basis of data on the traveling direction and the traveled distance detected by said means;
   map information storage means for previously storing map information including data, on the positions of a multiplicity of nodes set on roads and connections therebetween, said nodes including said start node;
   node selection means for selecting nodes which are directly linked to the start node on the basis of the connection data from among said multiplicity of nodes set on roads;
   node bearing calculating means for calculating the bearing from the present position of the vehicle obtained by said vehicle position assuming means to each of said nodes selected by said node selection means;
   comparison means for comparing the bearing to each of said nodes selected by said node selection means with the vehicle traveling direction obtained by said direction detection means; and
   node elimination means for eliminating nodes judged to be impossible to select as target nodes from among the nodes selected by said node selection means on the basis of the result of the comparison effected by said comparison means.

2. An apparatus according to claim 1, further comprising control means for controlling said node selection means so that said selection means can select nodes which are connected to the start node each time the vehicle is determined to have reached the start node and maintains the selected nodes until eliminated by said elimination means.

3. An apparatus according to claim 1, further comprising:
   means for calculating the distance between a single remaining node after said node elimination means has eliminated all other nodes and the vehicle position assumed by said vehicle position assuming means, and means for comparing this distance with a predetermined first threshold value, and wherein it is determined that said single node remaining uneliminated is a node reached by the vehicle when said distance between said selected node and the present position becomes smaller than said first threshold value.

4. An apparatus according to claim 1, further comprising:
   control means for activating said node bearing calculation means, said node selection means and said node elimination means each time the vehicle travels a predetermined distance.

5. An apparatus according to claim 1, wherein said comparison means further:
   calculates the angles of said bearings calculated by said node bearing calculating means, with respect to the present direction of the vehicle detected by said direction detection means,
   divides said angles with the traveled distance detected by said distance, and
   compares the quotients of the division with a predetermined value, and
   said node elimination means determines that, when said quotients are larger than said predetermined value, the corresponding nodes should be eliminated.

6. An apparatus according to claim 1, wherein said comparison means further:
   calculates the angles of said bearings calculated by said node bearing calculating means with the present direction of the vehicle detected by said direction detection means,
   divides said angles by the traveled distance detected by said distance detection means,
   multiplies said angles by a weight function the value of which increases as said angle increases, and
   compares the product of the multiplication with a predetermined value, and
   said node elimination means determines that, when said products are larger than said predetermined value, the corresponding nodes should be eliminated.

7. An apparatus for navigating a vehicle, comprising:
   direction detection means for detecting the direction in which the vehicle is traveling;
   distance detection means for detecting the distance traveled;
   vehicle position assuming means for assuming the present position of the vehicle relative to a reference position on the basis of data on the traveling direction and the traveled distance detected by said means;
   map information storage means for previously storing map information including data, on the positions of a multiplicity of nodes set on roads and connections therebetween;
   road-in-memory assuming means for assuming, on the basis of said present position of the vehicle and the connections between said nodes stored in said storage means, that the vehicle is traveling on a road-in-memory connecting nodes stored in said storage means;
   distance calculation means for calculating the distance between the present position of the vehicle and the road-in-memory assumed by road-in-memory assuming means; and
   determination means for determining when the calculated distance becomes larger than a predetermined second threshold value, that the vehicle is traveling a road-not-in-memory, said second threshold value increasing in response to the increase in the traveled distance.

8. An apparatus according to claim 7, further comprising:
   node bearing calculating means for calculating the bearing from the present position of the vehicle obtained by said vehicle position assuming means to each of said nodes stored in said storage means;
   node selection means for comparing the bearing to each of said nodes with the vehicle traveling direction obtained by said direction detection means, and for selecting, on the basis of the results of said comparison, one of said nodes toward which the vehicle is proceeding;
   control means for controlling said node bearing calculation means and said node selection means so as to activate the same each time the vehicle travels a predetermined distance; and elimination means, operating under the control of said control means, for eliminating nodes judged to be impossible to select as target nodes on the basis of the result of the comparison effected by said node selection means;

wherein, when the number of remaining nodes becomes naught, as a result of elimination effected by said node elimination means, it is determined that the vehicle is traveling along a road-not-in-memory.

9. An apparatus according to claim 7, further comprising:

means for storing the position of a point on a road-not-in-memory which the vehicle has entered after traveling along a road in memory, if said determination means determines that the vehicle is traveling along a road not in memory;

means for calculating the distance traveled from said point;

means for setting an area related to the distance traveled from said point;

means for seeking a node stored within said set area; and means for calculating the distance between the vehicle position and the node found in said area and comparing this distance with a third threshold value;

whereby, when the distance to said node found in said area becomes smaller than said third threshold value, it is determined that the vehicle has proceeded from the road not in memory to a road in memory.

10. An apparatus according to claim 9, wherein said area corresponding to the traveled distance is a circular region proportional to the traveled distance.

11. An apparatus for navigating a vehicle, comprising:

direction detection means for detecting the direction in which the vehicle is traveling;

distance detection means for detecting the distance traveled;

vehicle position assuming means for assuming the present position of the vehicle relative to a reference position on the basis of data on the traveling direction and the traveled distance detected by said means;

map information storage means for previously storing map information data on the positions of a multiplicity of nodes set on roads;

bearing storage means for storing, as a first bearing, the direction detected by said direction detection means;

means for recognizing that the vehicle has started turning on the basis of the direction detected by said direction detection means;

means activated after said recognition of the start of turning to recognize that a portion of the road along which the vehicle is traveling is straight, and to calculate the average of bearings obtained from said direction detection means as the vehicle passes said portion of the road; and means for comparing the difference between said average of bearings and said first bearing with a predetermined threshold value, and for determining when the average of bearings is larger than said threshold value that the vehicle has passed a corner and for determining that the vehicle has passed a curve other than a corner when the difference between said first bearing and said average of bearings has exceeded a threshold value a predetermined number of times.

* * * * *

UNITED STATES PATENT AND TRADEMARK OFFICE
CERTIFICATE OF CORRECTION

PATENT NO. : 5,109,344

DATED : April 28, 1992

INVENTOR(S) : Kikihara et al.

It is certified that error appears in the above-identified patent and that said Letters Patent is hereby corrected as shown below:

column 6, line 68:
"to the" should be --for the--;

column 7, line 40:
"(s, y)" should be --(x, y)--;

column 8, line 52:
after "nodes" insert --located--;

column 8, line 57:
"with a" should be --within a--;

column 9, line 35:
"$\phi_2 - \phi_2$" should be --$\phi_1 - \phi_2$--;

column 12, line 18:
"FC" should be --$F_C$--;

column 12, line 54:
"DM" should be --$D_M$--;

column 13, line 36:
after "vehicle" delete --is--;

column 14, line 21:
"NL" should be --$N_L$--;

column 14, line 36:
"$N_1N_3$" should be --$N_1$, $N_3$--;

UNITED STATES PATENT AND TRADEMARK OFFICE
CERTIFICATE OF CORRECTION

PATENT NO. : 5,109,344

DATED : April 28, 1992

INVENTOR(S) : Kikihara et al.

It is certified that error appears in the above-identified patent and that said Letters Patent is hereby corrected as shown below:

column 15, line 4:
"Ni" should be --$N_i$--;

column 18, line 27:
"PC" should be --$P_C$--;

column 18, line 49:
"X." should be --X--.

Signed and Sealed this

Twelfth Day of October, 1993

Attest:

BRUCE LEHMAN

*Attesting Officer*   *Commissioner of Patents and Trademarks*